(12) United States Patent
Zeier

(10) Patent No.: US 9,166,435 B2
(45) Date of Patent: *Oct. 20, 2015

(54) UNIVERSAL INDUSTRIAL BATTERY OPTIMIZATION DEVICE

(71) Applicant: Bruce Eric Zeier, Romoland, CA (US)

(72) Inventor: Bruce Eric Zeier, Romoland, CA (US)

( * ) Notice: Subject to any disclaimer, the term of this patent is extended or adjusted under 35 U.S.C. 154(b) by 244 days.

This patent is subject to a terminal disclaimer.

(21) Appl. No.: 13/923,562

(22) Filed: Jun. 21, 2013

(65) Prior Publication Data

US 2014/0375276 A1     Dec. 25, 2014

Related U.S. Application Data

(63) Continuation of application No. 12/590,466, filed on Nov. 9, 2009, now Pat. No. 8,330,428.

(60) Provisional application No. 61/114,051, filed on Nov. 12, 2008, provisional application No. 61/663,746, filed on Jun. 25, 2012.

(51) Int. Cl.
| | |
|---|---|
| *H02J 7/04* | (2006.01) |
| *H02J 7/16* | (2006.01) |
| *H02J 7/00* | (2006.01) |
| *H01M 10/06* | (2006.01) |
| *H01M 10/42* | (2006.01) |

(52) U.S. Cl.
CPC .............. *H02J 7/0057* (2013.01); *H01M 10/06* (2013.01); *H01M 10/4242* (2013.01); *H02J 7/0075* (2013.01); *Y02E 60/126* (2013.01); *Y02T 10/7016* (2013.01)

(58) Field of Classification Search
CPC ....... H02J 7/022; H02J 7/0093; H02J 7/0068; H02J 7/0072; Y02E 60/12
USPC ......................................................... 320/145
See application file for complete search history.

(56) References Cited

U.S. PATENT DOCUMENTS

| | | | |
|---|---|---|---|
| 4,079,443 A * | 3/1978 | Udvardi-Lakos et al. ...... 363/49 |
| 5,648,714 A | 7/1997 | Eryou et al. |
| 5,677,612 A | 10/1997 | Campagnuolo et al. |
| 5,891,590 A | 4/1999 | King |
| 6,184,650 B1 | 2/2001 | Gelbman |
| 6,414,465 B1 | 7/2002 | Banks et al. |
| 6,556,019 B2 | 4/2003 | Bertness |
| 6,586,850 B1 | 7/2003 | Powers |
| 6,586,913 B2 | 7/2003 | Rolfes |
| 6,822,425 B2 | 11/2004 | Krieger et al. |
| 6,975,071 B2 | 12/2005 | Tsai |
| 7,145,266 B2 | 12/2006 | Lynch et al. |
| 2008/0143299 A1 | 6/2008 | Altman |
| 2008/0169819 A1 | 7/2008 | Ishii |
| 2008/0185996 A1 | 8/2008 | Krieger et al. |
| 2008/0247199 A1* | 10/2008 | Djenguerian et al. .......... 363/50 |
| 2009/0289602 A1 | 11/2009 | Ng |
| 2010/0127666 A1* | 5/2010 | Ball .............................. 320/152 |
| 2011/0248835 A1* | 10/2011 | Speegle et al. ............. 340/12.32 |

* cited by examiner

*Primary Examiner* — Arun Williams

(74) *Attorney, Agent, or Firm* — Kirk A. Buhler; Buhler & Associates

(57) ABSTRACT

Improvements in a battery de-sulfating device are disclosed. The improvements including a plurality of capacitive discharge channels selectively activatable by a control board to provide a pulse wave modulated de-sulfating current to a lead-acid battery. The de-sulfating current can be a variable, or harmonic, repeating pattern of about 0.1-1.5 ms ON pulse followed by an about 2-9 ms OFF period which may be applied to the battery at an operator-adjustable peak amperage of about 0-350 amps. The de-sulfation process before, during or after the normal battery charging cycle, or any combination thereof. The temperature of the battery and the specific gravity of the fluid within the battery is measure during the de-sulfating process. The extent of sulfation of the battery may be ascertained by measuring the impedance of the battery.

16 Claims, 14 Drawing Sheets

| Charge Cycle | Input Current to Capacitor | Battery Voltage | Battery Peak Amps |
|---|---|---|---|
| 1 | 200 ma | 12.5 V | 0 |
| 2 | 400 ma | 12.5 V | 0 |
| 3 | 600 ma | 12.5 V | 0 |
| 4 | 800 ma | 12.5 V | 0 |
| 5 | 1 amp | 12.6 V | 30 |
| 6 | 1.2 amp | 12.7 V | 60 |
| 7 | 1.4 amp | 12.8 V | 90 |
| 8 | 1.6 amp | 12.9 V | 120 |
| 9 | 1.5 amp | 12.85 V | 110 |
| 10 | 1.45 amp | 12.825 V | 100 |
| 11 | 1.45 amp | 12.825 V | 100 |
| 12 | 1.45 amp | 12.825 V | 100 |

FIG. 8

| Charge Cycle | Battery Impedance in milli-ohms from Sulfation | Input Current to Capacitor | Battery Voltage | Battery Peak Amps |
|---|---|---|---|---|
| 1 | 10 | 1.45 amp | 12.8V | 100 |
| 2 | 10 | 1.45 amp | 12.8V | 100 |
| 3 | 9 | 1.45 amp | 12.9V | 110 |
| 4 | 9 | 1.25 amp | 12.85V | 90 |
| 5 | 9 | 1.35 amp | 12.9V | 100 |
| 6 | 9 | 1.35 amp | 12.9V | 100 |
| 7 | 9 | 1.35 amp | 12.9V | 100 |
| 8 | 8 | 1.35 amp | 13.0V | 110 |
| 9 | 8 | 1.15 amp | 12.95V | 90 |
| 10 | 8 | 1.25 amp | 13.0V | 100 |
| 11 | 8 | 1.25 amp | 13.0V | 100 |
| 12 | 7 | 1.25 amp | 13.1V | 100 |

FIG. 9

UNIVERSAL INDUSTRIAL BATTERY OPTIMIZATION DEVICE

CROSS REFERENCE TO RELATED APPLICATION

This application is a continuation of application Ser. No. 12/590,466, filed on Nov. 9, 2009 now U.S. Pat. No. 8,330,428 which claims the benefit of Provisional Application Ser. No. 61/114,051 filed Nov. 12, 2008. This application also claims priority to Provisional Applications 61/535,327 filed Sep. 15, 2011, Provisional Application 61/257,619 filed Nov. 3, 2009, Provisional Application 61/330,357 filed May 10, 2010 and Provisional Application 61/663,746 filed Jun. 25, 2012 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to the Industrial Battery Field. Specifically, applying an electronically or computer controlled battery optimization de-sulfation process using integral or external devices, to minimize the internal impedance of the battery caused by excess daily or periodic sulfation. This optimization control device command and control processes may be based in whole or in part upon the real time collection of raw battery metric data, or the use of simple timing algorithms, compared to most previous specific battery data and/or comparison with "like kind" comparative battery databases. The invention may also be used to provide advanced electrical savings capabilities to the battery operation, by the non-native control and modification of the battery charger's output. The invention may also be used to provide advanced electrical savings capabilities to the battery operation, by the reduction or elimination of a weekly or periodic "Equalization Charge." The invention may also be used to provide advanced life extension capabilities by the reduction in the gradual "Cycle Compensation Effect," that is, the reduction of sulfation induced, ever increasing charging/discharging cycles to accomplish the same degree of workload. The invention may also be used to reduce or eliminate battery desulfation services currently and repetitively required, resulting from sulfation induced increasing resistance.

2. Description of Related Art Including Information Disclosed Under 37 CFR 1.97 and 1.98

The present disclosure is directed to a battery optimization interface module located between a battery and the battery charger, or a battery charger circuitry integrated control device to automatically scan, develop commands and thereinafter control the continuous performance optimization of lead acid batteries. This Scan, Command and Control means is based in whole or in part, upon the real time gathering and processing of scientific measurements of battery or battery cell metrics, controlling the application of integral or external electronic de-sulfating devices upon the battery, or controlling non-electronic de-sulfation means applied to the battery such as the injection of chemical additives into the battery cells; to maintain the battery at the lowest possible internal resistance level hereinafter referred to as The Battery Optimization (IBO) process. More particularly, the automatic battery de-sulfating of lead acid batteries preceding, after, or in conjunction with a charging cycle or process, thus maintaining the battery in an optimized daily or other periodically based condition.

The present disclosure also provides for the external control of the battery charger to battery connection means, interrupting that connection means using an external measuring, computational and processing device to control the charger's output to the battery, regardless of the charger's native charge profile requirements; that may in whole or in part based upon battery optimization processes, and in whole or in part by battery or battery cell scientific metrics gathered and processed by internal or external means.

The present disclosure also provides for the real time qualitative rating (scoring) of the battery's optimization status by automatically and quantifiably determining that status using real time data obtained and processed by a computer hardware and software system, then compared to: 1) the same battery data of previous battery optimization or charge process cycles, or 2) to a historical battery database of other like kind batteries undergoing the same charging, de-sulfation or optimization processes. The present disclosure also provides for the real time control of the battery charging or optimization processes based upon the battery's optimization qualitative scoring.

The present disclosure contemplates that many devices do not have an automatic, real time method for measuring, evaluating or quantifying the impedance of a battery or battery cells metric(s), and controlling said de-sulfation means based in whole or in part upon that measured impedance(s). The present disclosure may provide the external measured impedance scan, command and control means to those devices.

The present disclosure contemplates that many do not have an automatic, real time method for measuring, evaluating or quantifying the electrolyte temperature of the battery cells metric, and controlling said de-sulfation means based in whole or in part upon that measured electrolyte temperature. The present disclosure may provide the external measured electrolyte temperature scan, command and control means to those devices, which may also be used for qualitative data analysis, or to modify the raw data of the specific gravity metric.

The present disclosure contemplates that many devices do not have an automatic, real time method for measuring, evaluating or quantifying the specific gravity of the battery cells metric, and controlling said de-sulfation means based in whole or in part upon that measured specific gravity. The present disclosure may provide the external measured specific gravity scan, command and control means to those devices.

The present disclosure contemplates that many devices do not have an automatic, real time method controlling said de-sulfation means, based in whole or in part upon the measured time metric before, during, or after an applied re-charge to the battery. The present disclosure may provide the external measured time scan, command and control means to those devices.

The present disclosure contemplates that many devices do not have an automatic, real time method for measuring, evaluating or quantifying the volts per cell of the battery cells metric, and controlling said de-sulfation means based in whole or in part upon that measured volts per cell. The present disclosure may provide the external measured volts per cell scan, command and control means to those devices.

The present disclosure contemplates that many devices do not have an automatic, real time method for measuring, evaluating or quantifying the battery voltage metric, and controlling said de-sulfation means based in whole or in part upon that measured battery voltage. The present disclosure may provide the external measured battery voltage scan, command and control means to those devices.

The present disclosure contemplates that many devices do not have an automatic, real time method for measuring, evaluating, quantifying or controlling the Charge Return Factor applied by the charger to the battery, and the means to control the battery charger's Charge Return Factor based in whole or in part upon the measurement of battery or battery cell metrics. The present disclosure may provide the external Charge Return Factor scan, command and control means to those devices.

The present disclosure contemplates that the battery optimization control device may also collect, process, store and transfer battery or battery cell metric data to other processing means, typically an external instrument, or computer based operating systems capable of individual or multiple battery or battery cell metric reading cycles.

The present disclosure contemplates that the battery optimization control device may also collect, process, store and transfer battery or battery cell metric data using a communication means to export said data to an external device, using a telemetry based, wireless, wired, the internet, or equivalent communications means to other processing devices such as computer based operational or analytical devices.

The present disclosure contemplates that the battery optimization control device may also collect, process, store and transfer battery or battery cell metric data in conjunction with a battery charger, using a communication means to export said data to an external device, using a telemetry based, wireless, wired, the internet, or equivalent communications means to other processing devices such as computer based operational or analytical devices.

The present disclosure contemplates that some battery or battery cell metrics may be used independently, or in combination with other battery or battery cell metrics, or other data means, for qualitative analysis of the battery or battery cells.

The present disclosure contemplates that the daily or other periodic application of automated sulfation elimination processes may reduce or eliminate the buildup of performance reducing "daily" sulfation. That reduction of daily sulfation may reduce or eliminate the formation of "crystalline" sulfation, which therefore, may reduce or eliminate the conventional battery sulfation elimination service requirements.

The present disclosure contemplates that the reduction of daily sulfation may reduce or eliminate the formation of performance reducing "crystalline" sulfation, which therefore, may reduce or eliminate the conventional battery sulfation performance loss over time causing the battery to require less charge/discharge cycles to perform the same workload, when compared to non-optimized batteries, utilizing significantly more of the intended charger/discharge life cycles referred to as "Cycle Extension or Preservation."

The present disclosure contemplates that the reduction of daily sulfation may reduce or eliminate the formation of performance reducing "crystalline" sulfation, which therefore, may reduce or eliminate the conventional battery sulfation performance loss over time causing the battery to use less electricity per charge.

The present disclosure contemplates that the reduction of daily sulfation may reduce or eliminate the formation of performance reducing "crystalline" sulfation, which therefore, may reduce or eliminate the conventional battery sulfation performance loss over time, reducing or eliminating the need to perform an "Equalization Charge" to the battery. This may result in electrical savings and cycle preservation extending the battery's useful life.

The present disclosure contemplates that some magnetic isolation transformers may be substituted with a High Frequency—Power Factor Corrected—Switching Isolation Transformer (HFISO). The HFISO may have the advantage of being lighter than a purely magnetic isolation means, may be less expensive to build than a purely magnetic isolation means, and because of power factor correction the HFISO may have a lower electrical operating cost than a purely magnetic isolation means.

The present disclosure contemplates the HFISO power supply may extract pulses from the AC mains that are spread throughout the mains sine wave and modulated in such a manner that the current in each pulse is proportionate to the demand needed for the battery de-sulfation, battery optimization process peak amplitude. These power supply pulses would be sufficient in number and frequency to allow each pulse to be stored and converted into individual discharge bursts to the storage capacitor, such that the full energy demand of the desired battery peak amplitude could be achieved. The amount of energy carried by each power supply pulse would be small enough to minimize the components and their energy storage requirements to economize the design. The HFISO device Power Factor may be defined by the controlled and constant ratio of the voltage to the current demand on the mains, and considered unity, by design to about 95%.

The present disclosure contemplates that some lead acid batteries may be constructed using individual cells connected by an external bus bar to form the nominal voltage desired from the battery. Individual cells may provide about two volts each; thus, a 12-volt motive battery may include 6 cells in series, a 24 volt battery may include twelve cells, and so on.

The present disclosure contemplates that the Battery Optimization Control Device uses an integral processor, memory, computer software algorithms and hardware combinations, to apply specific calibration adjustments, schedules and data tables modifying the raw battery metric data input of the device sensors, transducers and probes; utilizing those calibrated data measurements to automatically control the battery optimization process using integral or external de-sulfation electronic de-sulfation devices, or integral or external non-electronic de-sulfation means such as the injection of chemical additives into the battery cells.

The present disclosure contemplates that the battery optimization control device(s), processes, or process algorithm(s), may be integrated within or become a modification of, the native construction of the battery charger circuitry and or the charger's operational profile. The integration may provide the synergistic benefit of sharing common physical attributes of the device's construction, lowering the cost of the device's construction, improving the performance of batteries being charged by the charger, reducing the electrical costs of the charging process, providing the means to reduce the electrical cost of the battery's operation when using the battery charger, increasing the charger's native efficiency, modifying the charger's native operational profile, may allow the charger to import, process and utilize battery or battery cell metric data, may provide the charger a capability to command and control external devices, and provide the means for real time battery optimization and quantification of the battery's performance.

Prior art does not allow for the real-time measurement of battery or cell metrics and the resultant external, non-battery charger native, independent control of the charger to battery conductive means, based upon the analysis of those battery or battery cell metrics, automatically and periodically interrupting the conductive means to apply an external battery de-sulfation process before, during or after the battery charging process.

Prior art does not allow for the real time measurement of battery or cell metrics and the resultant internal battery charger, native circuitry control of or modification too, the charger's native charge profile, based upon the analysis of those battery or battery cell metrics, automatically and periodically applying an internal battery de-sulfation (optimization) process before, during or after the battery charging process.

Prior art does not allow for the real-time measurement of battery or cell metrics and the resultant external, non-battery charger native, independent control of the charger to battery conductive means, based upon the analysis of those metrics, automatically and periodically interrupting the said conductive means modifying and controlling applied battery Charge Return Factor.

Prior art does not allow for the real time measurement of battery or cell metrics and the resultant internal battery charger, native circuitry control of or modification too, the charger's native charge profile, based upon the analysis of those metrics, automatically and periodically applying a modification to the duration of the charger's application of charging current, referred to as the modification and control of the battery's Charge Return Factor.

Prior art does not allow for the real-time measurement of battery or cell metrics and the resultant external, non-battery charger native, independent control of the charger to battery conductive means, based upon the analysis of those metrics, automatically and periodically interrupting the said conductive means to eliminate, or modify the duration of, the charger's application of a periodic Equalization Charge current.

Prior art does not allow for the real time measurement of battery or cell metrics and the resultant internal battery charger, native circuitry elimination of or modification too, the charger's Equalization Charging duration profile, based upon the analysis of those metrics, automatically and periodically applying a modification to the duration of the charger's application of charging current, referred to as the elimination or modification and control of the battery's Equalization Charge current.

Prior art does not allow for the real time measurement of the impedance value(s), digitized specific gravity, cell electrolyte temperature, or the volts per cell, of the battery, or battery cells within an array of cells; using a single measurement means, a single attachment means, and a single data recording means; using analog or digital electronic signals provided by a transducer or sensor processed by electronic instrumentation, or a computer based operating system, collecting the raw data from the battery or battery cells and used in the control or modification of the charger's native charging profile.

Prior art does not allow that real time or historical battery or battery cell metrics may be used independently, or in combination with other battery or battery cell metrics, or other data means, for real time qualitative analysis of the battery or battery cells. This qualitative analysis may be used to modify or control the charger's native charging profile.

Prior art does not contemplate that the daily or other periodic application of automated sulfation elimination processes may reduce or eliminate the buildup of performance reducing "daily" sulfation. That reduction of daily sulfation may reduce or eliminate the formation of "crystalline" sulfation, which therefore, may reduce or eliminate the conventional battery sulfation elimination service requirements, allowing the battery to use less electricity per charge, to use significantly more of the intended charger/discharge life cycles referred to as "Cycle Extension or Preservation," and reduce or eliminate the "Equalization Charge" process.

BRIEF SUMMARY OF THE INVENTION

Exemplary embodiments may include a control means using a native, or internal, Industrial Battery Optimization (IBO) de-sulfating device including a single or plurality of capacitive discharge channels selectively activatable by a control board to provide a pulse wave modulated de-sulfating current to a lead-acid battery. Some exemplary embodiments may provide a de-sulfating current comprising an equally repeating pattern including an about 0.75 ms ON pulse followed by an about 4.5 ms OFF period, which may be applied to the battery at an operator determined, computer and software controlled, adjustable peak amperage of about 0-350 amps. Some exemplary embodiments may provide a de-sulfating current comprising an equally repeating pattern including an about 0.75 ms ON pulse followed by an about 9 ms OFF period, which may be applied to the battery at an operator determined, computer and software controlled, peak amperage of about 0-350 amps. Some exemplary embodiments may provide a de-sulfating current comprising a repeating pattern including an about 0.450 ms ON pulse followed by an about 2 ms OFF period, which may be applied to the battery at an operator determined, computer and software controlled, peak amperage of about 0-350 amps. While these "ON state" values are exemplary, the range of ON states may vary between 0 and 2 ms, whether in an "Equilibrium or Harmonic ON State Mode," while the OFF state is then determined by the time factor difference between the sine wave natural timing, 50 or 60 hz as an example, and the amount of time used by the ON state.

Some exemplary embodiments may provide a Harmonic/Oscillating de-sulfating current comprising a repeating, alternating pattern comprised of two pulse groupings, which are in turn separated by a timing period determined by either 1) the fixed natural sine wave frequency, or 2) the capability of the HFISO power supply to provide variable (Harmonic) ON state pulse separation The extent of sulfation of the battery may be ascertained by measuring the real time impedance of the battery, or a voltage drop test, or the real time measurement of the specific gravity of the battery cell(s), or any combination thereof; and/or the use of empirical historical battery metric data provided by battery mounted devices or historical battery metric data provided within databases identified and correlated to specific, individual batteries.

Exemplary embodiments may include a control means using a native, or internal, Industrial Battery Optimization de-sulfating device providing a battery single point, or cell-by-cell; automatic chemical additive injection system to provide automatic injection of battery additives, chemicals, water or adjust acidity levels, based upon battery or cell performance and the real time measurement of individual cell or battery metrics during the charging of the battery, or downloaded from a battery mounted storage device. The extent of sulfation of the battery may be ascertained by measuring the real time impedance of the battery, or a voltage drop test, or the real time measurement of the specific gravity of the battery cell(s), or any combination thereof; and/or the use of empirical historical battery metric data provided by battery mounted devices or historical battery metric data provided within databases identified and correlated to specific, individual batteries.

In an aspect, a method of de-sulfating a battery may include connecting a de-sulfating device to a battery; applying electrical pulses to the battery using the de-sulfating device, where the pulses comprise a variable, or Harmonic, repeating pattern including an about 0.1-1.5 ms ON pulse followed by an about 2-9 ms OFF period.

In a detailed embodiment, a "fixed" ON pulse may be about 0.1-01.5 ms and the fixed OFF period may be about 2-9 ms. In a detailed embodiment, the ON pulse may be about 0.75 ms and the OFF period may be about 4.5 ms. In a detailed embodiment, the ON pulse may be about 0.75 ms and the OFF period may be about 9 ms. In a detailed embodiment, the operation of connecting the de-sulfating device to the battery may include electrically connecting conductors between the de-sulfating device and an individual cell of the battery or terminals of the battery, where the terminals are electrically connected across a plurality of cells of the battery.

In a detailed embodiment, a "variable or harmonic" ON pulse may be varied on each successive pulse from about 0.1-01.5 ms and the variable or harmonic OFF period may be the difference between the total time between AC grid sine wave timing, and the varied ON state timing for each pulse cycle, between about 2-9 ms. In a detailed embodiment, the operation of connecting the de-sulfating device to the battery may include electrically connecting conductors between the de-sulfating device and an individual cell of the battery or terminals of the battery, where the terminals are electrically connected across a plurality of cells of the battery.

In a detailed embodiment, the operation of applying electrical pulses to the battery using the de-sulfating device may include selectively repeatedly activating a plurality of channel power pack modules electrically connected between an alternating current source and the battery, and, when activated, an individual channel power pack module may provide one ON pulse to the battery. In a detailed embodiment, the plurality of channel power pack modules may include a first channel power pack module and a second channel power pack module, and the operation of applying electrical pulses to the battery using the de-sulfating device may include alternately activating the first channel power pack module and the second channel power pack module.

In a detailed embodiment, the individual channel power pack module may include a rectifier electrically connected to the alternating current source, a switching device "A" electrically coupled to the output of the rectifier, a capacitor electrically connected to the output of the Switch A, a switching device "B" electrically coupled to the capacitor, and a diode electrically coupled to the Switching Device B, the diode being electrically connected to the battery, and the operation of applying electrical pulses to the battery using the de-sulfating device may include rectifying, using the rectifier, alternating current supplied by the alternating current source to produce direct current; charging the capacitor using the direct current by the means of clipping the input current using Switch A controlled by a digital software and hardware means; and discharging the capacitor to the battery by selectively allowing conduction through the switching device B controlled by a digital software and hardware means.

In a detailed embodiment, the operation of charging the capacitor by selectively allowing conduction through the switching device A may include determining, by a digital software and hardware means master control board, that the switching device A should allow conduction, including ascertaining that a plurality of safety conditions are satisfied and may be based at least partially upon a pulse signal received from a frequency generator; and signaling, by the digital software and hardware means master control board, the switching device A to allow conduction.

In a detailed embodiment, the operation of discharging the capacitor to the battery by selectively allowing conduction through the switching device B may include determining, by a digital software and hardware means master control board, that the switching device B should allow conduction, including ascertaining that a plurality of safety conditions are satisfied and may be based at least partially upon a pulse signal received from a frequency generator; and signaling, by the digital software and hardware means master control board, the switching device B to allow conduction.

In a detailed embodiment, a High Frequency, Isolated, Switch Mode and Power Factor Corrected (HFISO) alternating current source may include a digital software and hardware controlled, capacitor charging switching device, enabling a variable voltage alternating current source, and the method may include adjusting the on and off state of the capacitor switching device to obtain a desired peak amperage of the pulses.

In a detailed embodiment, a High Frequency, Isolated, Switch Mode and Power Factor Corrected (HFISO) alternating current source may include a digital software and hardware controlled, capacitor charging switching device, enabling a variable amperage alternating current source, and the method may include adjusting the on and off state of the capacitor switching device to obtain a desired peak amperage of the pulses.

In a detailed embodiment, a method may include determining that de-sulfation of the battery is substantially complete by measuring an impedance of the battery. In a detailed embodiment, the impedance of the battery may be determined at least in part from a difference between root-mean-square amperage of the pulses and a peak amperage of the pulses.

In a detailed embodiment, a method may include determining that de-sulfation of the battery is substantially complete by the real time measurement of the electrolyte specific gravity of the battery, determined at least in part from a digital signal transmitted from a specific gravity probe in contact with the battery electrolyte. In a detailed embodiment, the specific gravity measurement of the battery may be determined by the measurement of the electrolyte temperature a corresponding adjustment of the raw specific gravity data, thereby temperature compensating the specific gravity measurement.

In a detailed embodiment, the operation of applying electrical pulses to the battery using the de-sulfating device may include applying an ON pulse having a peak amperage of about 20-30 amps. In a detailed embodiment, the operation of applying electrical pulses to the battery using the de-sulfating device may include applying an ON pulse having a peak amperage of about 40-60 amps. In a detailed embodiment, the operation of applying electrical pulses to the battery using the de-sulfating device may include applying an ON pulse having a peak amperage of about 40-130 amps. In a detailed embodiment, the operation of applying electrical pulses to the battery using the de-sulfating device may include applying an ON pulse having a peak amperage of about 130-350 amps.

In an aspect, a battery de-sulfation device may include an alternating current source; output conductors configured for electrical connection to a battery; a single or plurality of channel power pack modules electrically interposing the alternating current source and the output conductors, each channel power pack module including a rectifier electrically connected to the alternating current source, a capacitor electrically connected to an output of charging switch "A", a capacitor electrically connected to an output of discharging switch "B", the rectifier, a charging switching device an electrically connected to the capacitor, a charging switching device B electrically connected to the capacitor, and a diode electrically connected to the output of the switching module; and a master control board operative to control a conduction state of each of the switching devices. The master control board may be configured to control the conduction states of the switching devices to provide a pulsed direct current output to the battery.

In a detailed embodiment, the alternating current source may be a variable voltage, or variable current alternating current source, and a voltage or amperage output from the variable voltage alternating current source may be created and adjustable by a digital software and hardware means master control board driven charging switch. The charging switch opens and closes as commanded by the master control board, when closed allowing the capacitor current to rise in synchronization with the natural alternating current sine wave current, until the charging current reaches the targeted value. The charging switch then closes containing the charge current within the capacitor storage means until the discharge switch closes discharging the stored current into the battery.

In a dual channel detailed embodiment, the master control board may be configured to control the conduction states of the switching devices to provide a pulsed direct current output to the battery predicated upon a synchronous, repeating pattern, determined in whole or in part, by the frequency of the AC grid power source. The applied pattern may viewed and consist of the grouping of two pulses each, the first pair considered the Primary Pulse grouping and the second pair is considered the Secondary Pulse Grouping. The paired groupings are synchronized between the individual since waves of the AC grid power supply, between 50 Hz sine waves and 60 Hz sine waves as an example. While individual pulse patterns may be voluntarily "omitted or skipped." The maximum frequency of the pulses may controlled by the sine wave frequency in the AC Rectifier power supply version. The dual channel embodiment used in a 50 Hz AC mains environment would therefore create fewer pulses per second than the same system used in a 60 hz AC main environment.

In a dual channel detailed embodiment, the master control board may be configured to control the conduction states of the switching devices to provide a pulsed direct current output to the battery predicated upon an asynchronous pattern, determined in whole or in part, by the capabilities of the HFISO power supply to supply the current or voltage controlled power, and the desirous frequency, to the Primary and Secondary paired pulses. The applied pattern may consist of the grouping of two pulses each, the first pair considered the Primary Pulse grouping and the second pair is considered the Secondary Pulse Grouping. Each individual pulse of the pair may be either symmetrical or asymmetrical with respect to each other, or a single or variable pulse frequency may be created without a "paired grouping". The paired groupings, when used, or an individual synchronous or asynchronous pattern, are pattern and amplitude limited only by the current or voltage storage capacity of the HFISO system.

In a single channel detailed embodiment, the master control board may be configured to control the conduction states of the switching devices to provide a pulsed direct current output to the battery including a repeating pattern including approximately 0.75 ms ON pulses interposed by approximately 9 ms OFF periods. While these parameters are considered exemplary, it is intended that the operational cycle may range between 0.1 to 2.0 ms ON pulses interposed by approximately 0.1 to 10 ms OFF periods.

In a detailed embodiment, a de-sulfating device may include a real time peak amperage indicator providing an indication of a peak amperage provided to the battery; an average amperage indicator providing a real time indication of a root-mean-square amperage provided to the battery; and an impedance indicator providing a real time indication of an impedance of the battery, where the impedance may be determined at least in part by ascertaining a difference between the peak amperage provided to the battery and the root-mean-square amperage provided to the battery.

In a detailed embodiment of a dual channel system, the master control board may be configured to control the conduction states of the switching devices associated with the first channel power pack module and the second channel power pack modules alternately such that each of the first channel power pack module and the second channel power pack module outputs a repeating pattern including an about 0.1 to 1.5 ms ON pulse followed by an about 0.1 to 10 ms OFF period and, together, the first channel power pack module and the second channel power pack module provide to the battery a repeating pattern determined by the sine wave timing using the rectified power supply, or a user defined ON and OFF state when using the HFISO power supply.

In a detailed embodiment the IBO External Device Specific Gravity Optical Measurement means has differing density, specially shaped and constructed disks stacked in a vertical array around the vertical light bar, each disk will begin to rise at an approximate specific gravity of the fluid differing from the previously stacked disk. One disk may be designed to a specific gravity of approximately 1.100, considered to be the approximate specific gravity of water. When used in the weakest battery acid solution, the 1.100 disk will rise past all the light bar elements until it reaches the light bar elements at the precise level of the surface of the battery acid solution. This is considered the electrolyte level. The second, sequential disk would have a specific gravity within the desired measurable range of the solution, such as 1.150. The SG device may also be a cylindrical design with the use of ball shaped instead of disk shaped devices, then housed within the cylinder to sink or float within the fluid inside the cylinder, rather than outside on the disk version. With respect to the cylindrical design, the LEDs may oppose the LRDs and the floating ball shape may block light passage, rather than reflect it when using the disk shaped In a detailed embodiment the IBO Control and Processing Electronic Circuit may contain electronic circuitry and processing capability to read raw battery/cell metric data, process battery/cell metric data, modify by raw data using a software calibration means, store data and import or export data or data commands to external instrumentation or a computer operating system.

In a detailed embodiment the IBO external transducer elements may be capable of being used solely or in combination with other external transducers, with the provision to be positioned or aligned in many different combinations and permutations of individual battery or battery cell arrays. The differing combinations and permutations are recognized by different software calibration algorithms designed to recognize the random orientation of battery or cell arrays in combination, or software calibration algorithms designed to recognize the specific, absolute cell orientation nature of battery or cell arrays in permutation.

In a detailed embodiment the IBO Control External Device transducers may provide the means to collect, process, store and transfer individual or multiple raw data metrics of a wide variety of differing types of battery or cell array physical configurations. The device allows numerous, accurate and electronically repetitive data samples to be obtained with only one labor installation action. The optimization device will provide as few as one sample, or sample quantities approaching infinity if desired, from one initial single measurement labor action.

In a detailed embodiment the IBO Control External Device transducers may provide a computer processing and storage means and a software calibration and comparative means; which allows the collection of individual, multiple or comparative raw battery data metrics of an individual battery or multiple individual batteries comprising a battery array; or the collection of individual, multiple or comparative raw battery cell data metrics of an individual battery cell or multiple individual battery cells comprising a battery cell array.

In a detailed embodiment the raw data collected by the IBO Control External Device transducers means may include one or more of the following: 1) individual cell (battery) voltage, 2) individual cell (battery) temperature, 3) individual cell (battery) electrolyte temperature, 4) individual cell electrolyte level, 5) individual or comparative cell (battery) impedance as measured from cell post to cell post, 5) individual or comparative cell (battery) impedance as measured from cell electrolyte to the negative battery post, 6) individual or comparative cell (battery) impedance as measured from cell electrolyte to the positive battery post, 7) cumulative battery or cell array impedance, 8) individual or comparative cell optically digitized specific gravity, 9) individual or comparative battery or cell charging rate, 10) individual or comparative battery or cell discharging rate, 11) the individual or comparative peak-to-peak values of applied pulse width modulated signals to the battery or battery cells, either individually or collectively, 12) the individual or comparative peak-to-peak frequency values of applied pulse width modulated signals to the battery or battery cells, either individually or collectively, 13) the comparison of peak amperage amplitude vs., average amperage applied to the battery or battery cells, either individually or collectively, 14) the collection of individual or comparative raw data related to the calculation of a Charge Return Factor, 15) the individual or comparative raw data relating to the collection of the battery or battery cell electrical efficiency index, 16) the individual or comparative cell (battery) lifetime cumulative re-charging energy consumed, 17) the collection of individual or comparative raw data related to the calculation of a useful battery life cycle extension (Cycle Preservation), 18) the collection of individual or comparative raw data related to the calculation of a modification or elimination of an Equalization Charge, 19) the collection of individual or comparative raw data related to the calculation of a Qualitative Analysis of the battery or battery cells, 20) the collection of individual or comparative raw data related to the calculation and control of the charger's native charging profile, and 21) ambient operational temperature.

In a detailed embodiment an electrolyte probe may be positioned and inserted into the electrolyte of the a battery cell. This probe has elements that may measure the electrolyte fluid level, elements that may measure the voltage of the electrolyte, elements that may measure electrolyte temperature, elements that may apply a modified Kelvin impedance measurement means using conductive element contacts externally to the battery cell terminal posts, or internally within the electrolyte, or a combination thereof; and an optically digitized specific gravity conductive means.

In a detailed embodiment an IBO battery external device measurement means may incorporate a specialized Kelvin type probe connection. The term Kelvin Connection, also commonly known as the embodiment of a clamp type design known as a Kelvin Clamp, is an industry accepted means by which an electrical signal is sent into a battery using one pair of conductors often referred to as the Force Pair, while a second pair of electrically isolated conductors known as the Sense Pair measures the resultant voltage drop across the battery terminals. The present invention incorporates the use of sharpened, precisely positioned Kevin type conductive probes, an applied pressure alignment means, physical positioning means, and a non-flexible conductive means to bi-directionally transmit and receive the applied force and sense electronic signals. The present invention may also incorporate the use of electrolyte immersed Kevin type conductive probes in either a cell electrolyte to cell electrolyte capacity, or in a cell electrolyte to cell terminal contact position capacity, with a flexible and/or non-flexible bi-directional conductive means.

The IBO Control Device provides the means to control external ancillary devices such as a charger, alternatively manufactured desulfation devices, or a load-testing device.

The IBO Control Device provides the means to automatically apply separate and distinct software calibration schedules dependent upon the type of battery configuration sensed by the variable configurations of the device.

The IBO Control Device provides the conductive means to bi-directionally transfer electrical signals between probes and or transducers from and individual battery(s) or battery cell (s), to the measurement and processing means using a stationary and non-flexible conductive means, rather than a flexible means such as electrical wires.

The IBO Control Device may substitute a High Frequency—Power Factor Corrected—Switching Isolation Transformer (HFISO) as a replacement for a magnetic isolation transformer to isolate the electrical grid from the IBO device output. The HFISO may have the advantage of being lighter than a purely magnetic isolation means, may be less expensive to build than a purely magnetic isolation means, and because of power factor correction, the HFISO may have a lower electrical operating cost than a purely magnetic isolation means. The HFISO is controlled by the MCB to provide a synchronous output of current to the rectifier of either a single or dual channel power pack system.

As the MCB senses the need for a higher current input into the capacitor, it then provides a reference signal to the HFISO to increase the current output capability of the HFISO. The HFISO then ramps up the output voltage and current to meet the demand of the MCB.

As the MCB senses the need for a lower current input into the capacitor, it then provides a reference signal to the HFISO to decrease the current output capability of the HFISO. The HFISO then ramps down the output voltage and current to meet the demand of the MCB.

As the MCB senses that the measured peak from the battery and the target peak provided from the power pack system are equal, then continued repetitive and equal commands are sent to the HFISO from the MCB until the compared measured peak to target peak values are no longer equal. In the event that the measured peak and target peak values become unequal, then the MCB commands the HFISO to either ramp upwards in the case of the measured peak being lower than the target peak, or ramp downwards in the case of the measured peak being higher than the target peak amps.

The IBO Control Device provides the conductive means to bi-directionally transfer raw data to and from a specially designed specific gravity probe or transducer inserted into the electrolyte of individual battery cells.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

FIG. 1 is block diagram of an exemplary Industrial Battery Optimization control device.

FIGS. 2A-C are diagrams showing the differing capacitor charging sine waves.

Figure 6A:
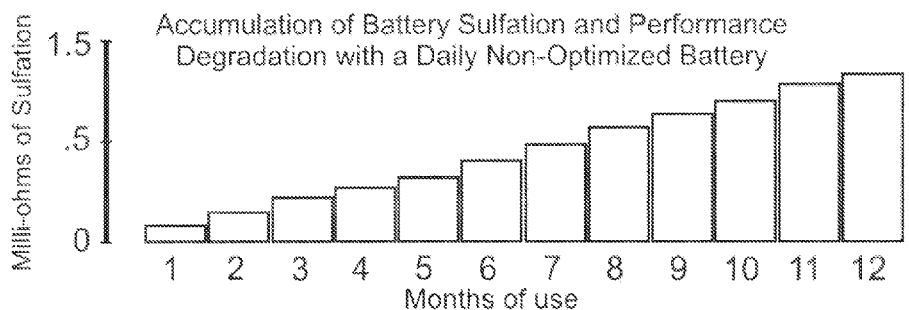
Figure 6B:
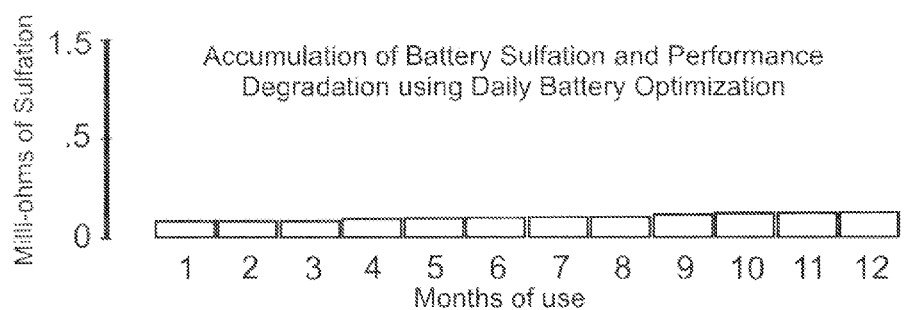

FIGS. 6A-B show diagrams comparing performance loss from sulfation when using the conventional battery operation compared to automatic optimization processes.

Figure 7A:
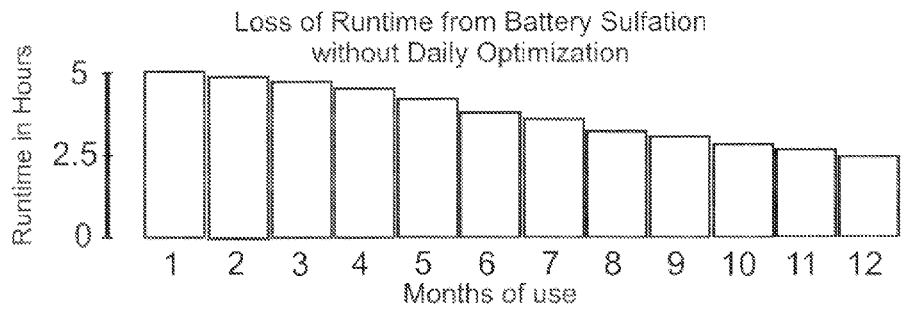
Figure 7B:
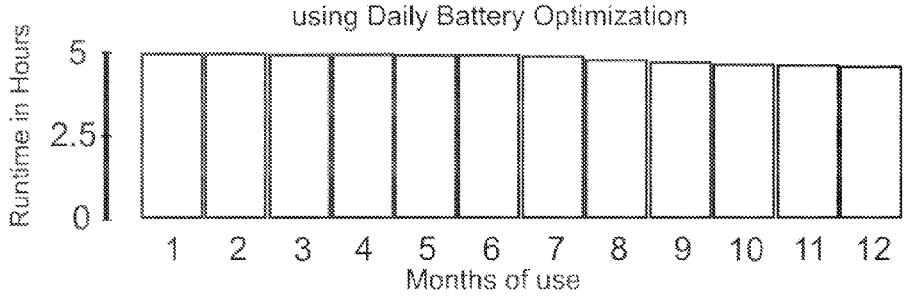

FIGS. 7A-B are charts showing the phenomenon of Cycle Compensation, or Loss of Runtime caused by Sulfation.

FIG. 8 is a data table of the ramp up process when starting the optimization process on a 12-volt battery using a 200 milli-amp default ramp up current and a target of 100 amps peak-to-peak at the battery.

FIG. 9 is a data table of the ramp up/ramp down process when maintaining a real time target battery peak-to-peak value. Those values change as the de-sulfation techniques are applied during battery optimization.

Figure 10:
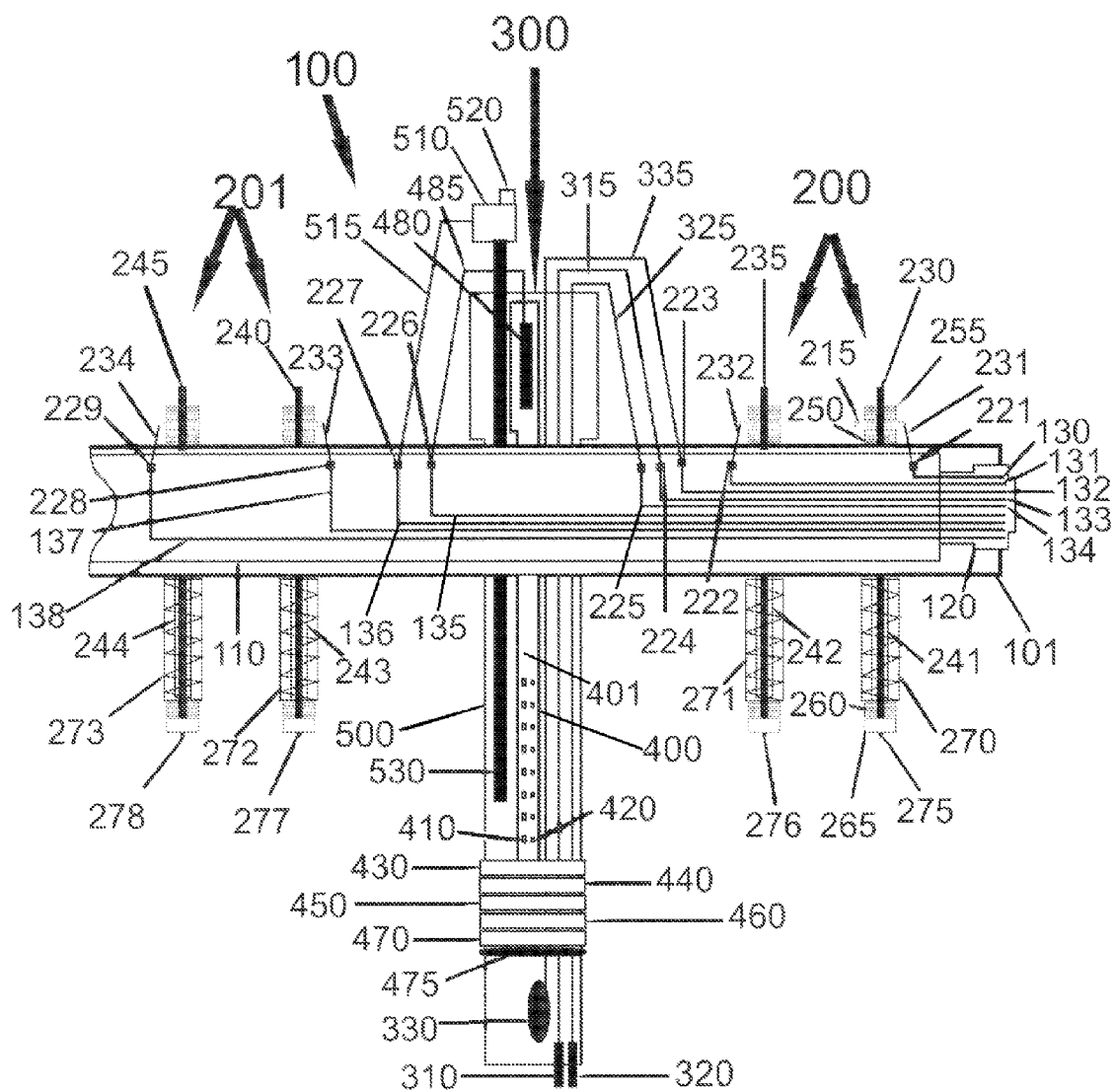

FIG. 10 is a diagram of the Industrial Battery Optimization Probe (BattSmart)

Figure 11:
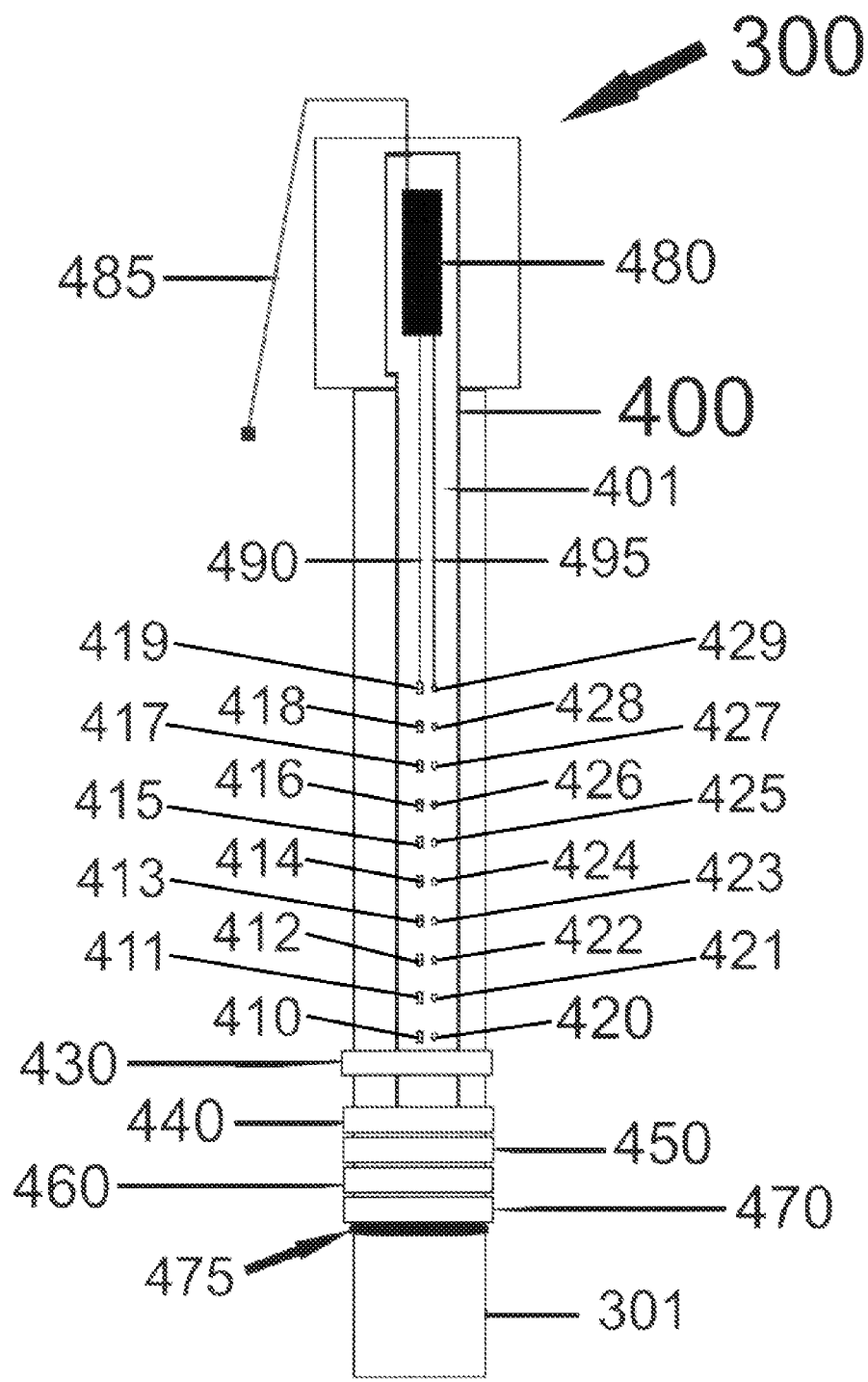

FIG. 11 is a detailed diagram of a Specific Gravity Probe.

Figure 12:
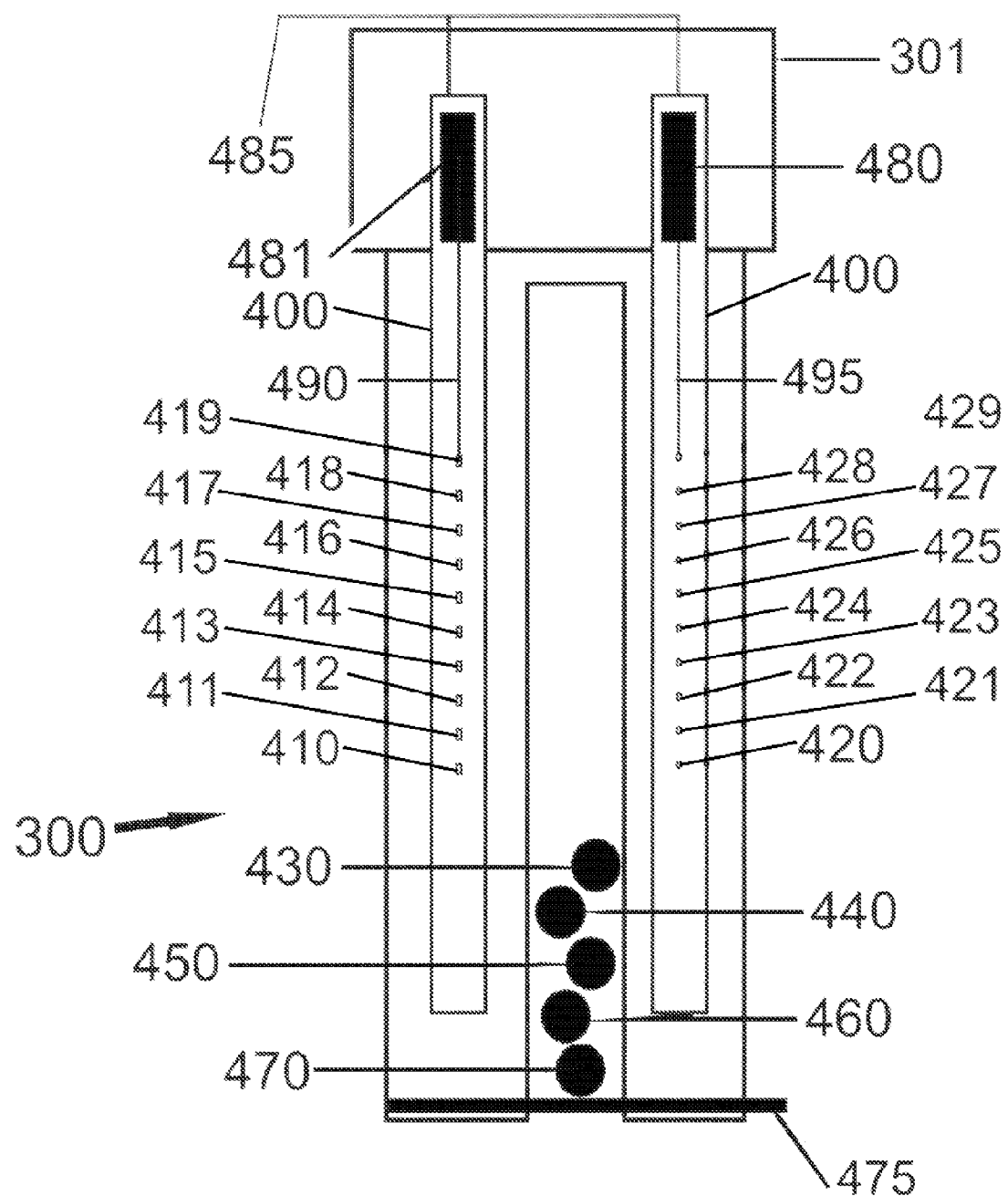

FIG. 12 is a detailed diagram of an alternate Specific Gravity Probe.

FIGS. 13A-E show detailed views of the specific gravity disks and the corresponding voltage table.

Figure 14:
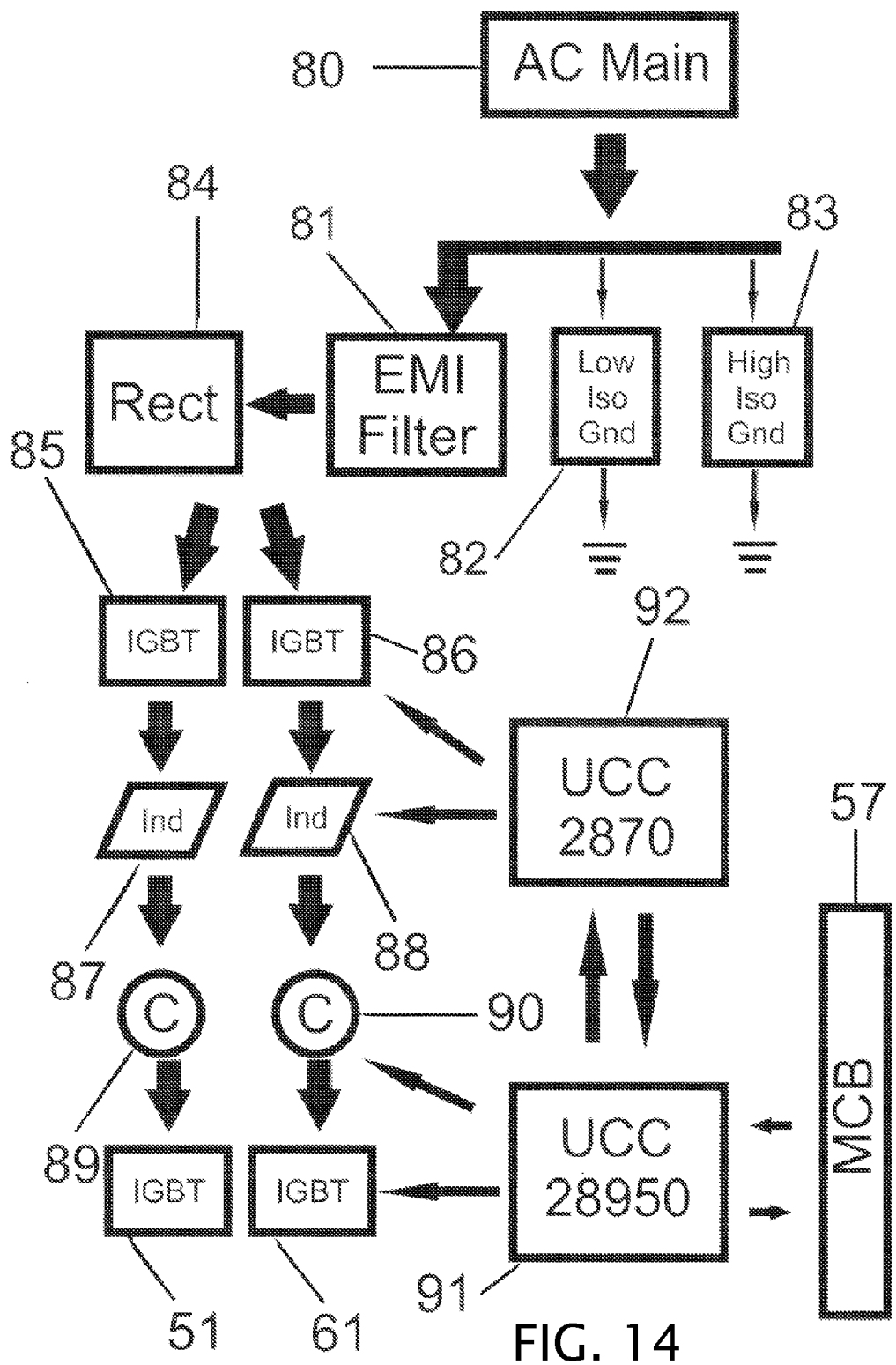

FIG. 14 is a block diagram of the optional exemplary HFISO power supply.

Figure 15A:
Figure 15B:
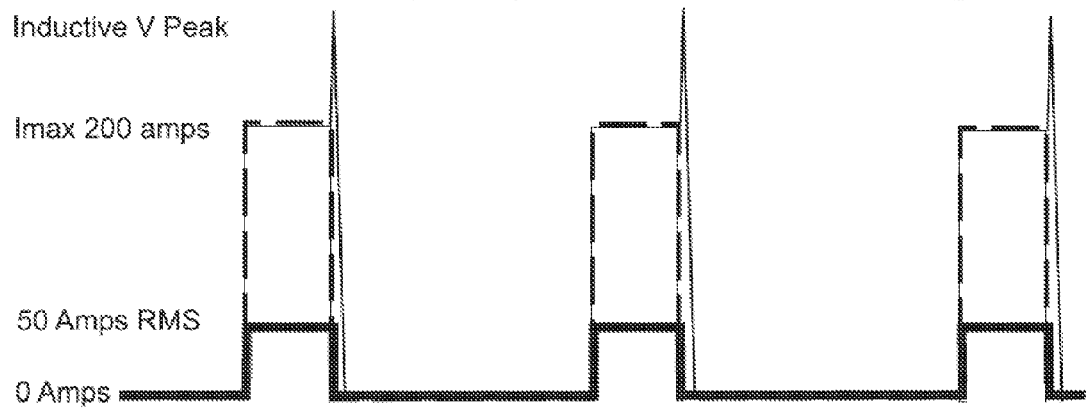
Figure 15C:
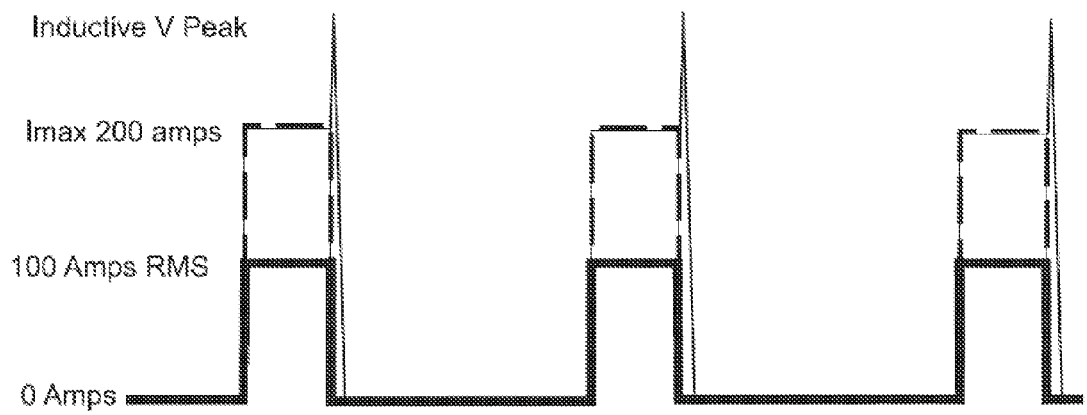

FIGS. 15A-C show conventional and variable peak frequency discharges.

Figure 16:
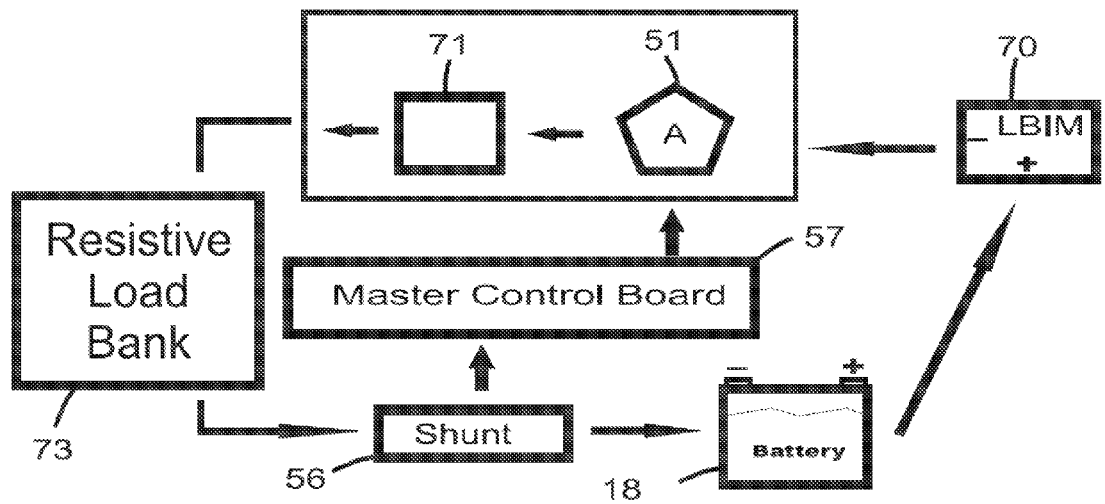

FIG. 16 shows a first embodiment of a Load Bank Interconnecting Means.

Figure 17:
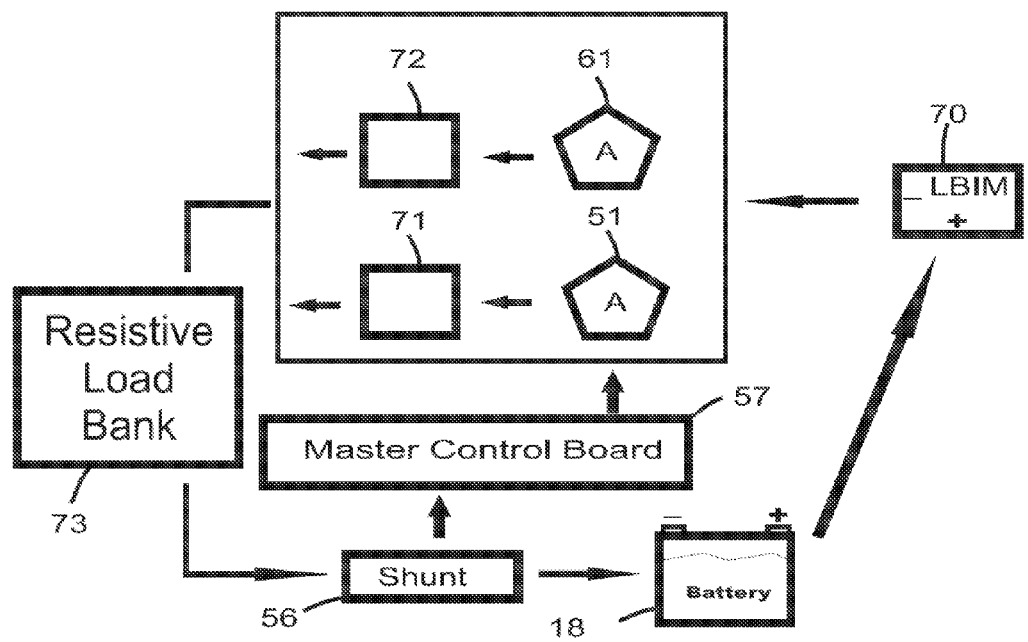

FIG. 17 shows a second embodiment of a Load Bank Interconnecting Means.

DETAILED DESCRIPTION OF THE INVENTION

For this application, a "desulfation means" is defined as a stand-alone device to de-sulfate the battery without a charging means, or a charger that provides only what is commercially viewed as a "conventional Charging means."

In the following Industrial Battery Optimization (IBO) Device system description there are two elements, first optional device commercially known as the BattSmart external battery cell probe and second the Charger Interface Module (CIM).

The optional BattSmart device contains the Specific Gravity Optical Digitizer, the Kelvin type impedance probes, temperature and voltage collection means and the electronic circuitry providing the processing, storage and data communication means between the CIM and the BattSmart device. The BattSmart Scan individual battery or battery cell metrics, allow the operator to develop computer based Commands that automate applied processes to the individual battery cells, and Control ancillary devices that apply the developed process(s) to the individual battery cells.

The Charger Interface Module contains the electronic circuits and software means commercially known as the Zulu One System, that is designed to Scan individual battery or battery cell metrics, control the charger to battery interconnections means, allow the operator to develop computer based Commands that automate battery optimization processes to the battery, and Control the charger or ancillary devices that apply the developed process(s) to the battery. The CIM contains the internal de-sulfation means such as the single or dual channel power pack system(s), and the internal communication means such as a wired or wireless, bi directional communications means to transfer data into and out of the IBO. The CIM also provides the input and output means between the operator and the external or internal devices such as a keypad, switches, LED indication lights, audio alarms, a touch screen display monitor, computer interface connections, cable connections for external devices, cable connections for the battery, cable connections for the battery charger integration, thermal and electrical circuit protection devices, and other input-output requirements.

Figure 1:
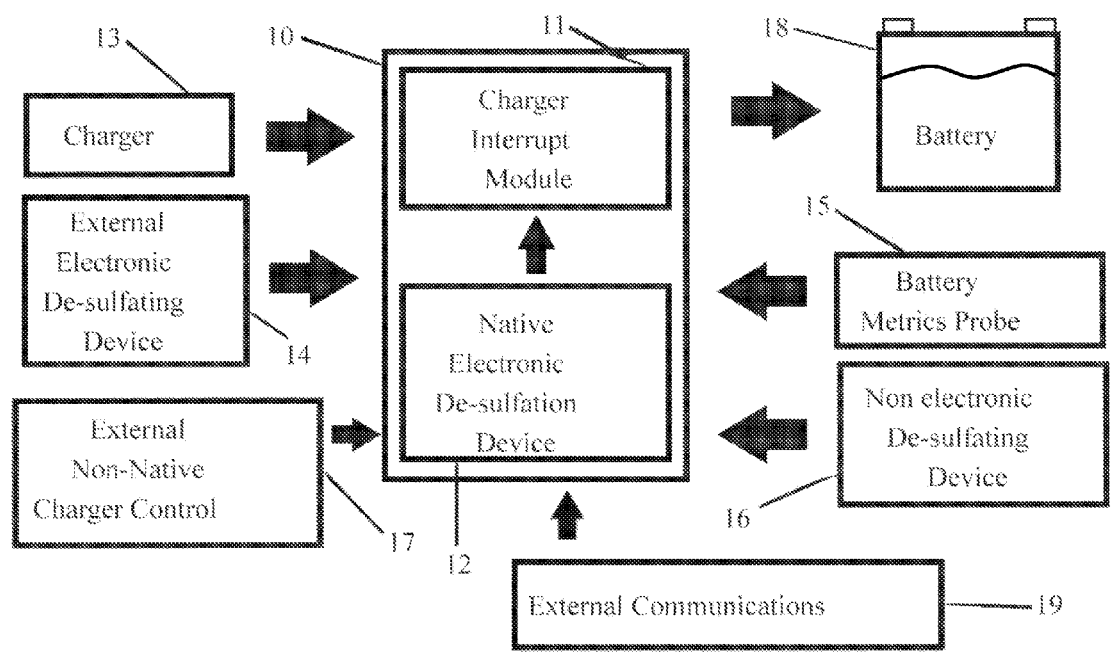

FIG. 1 illustrates the block diagram of the Industrial Battery Optimization (IBO) system and the interconnecting devices. The IBO 10 consists of the Charger Interrupt Module 11, which electrically connects or disconnects the charger 13; or internal de-sulfation means 12 or external devices 16, to the battery. A Battery Metrics probe 15 connects to the IBO 10. The native battery de-sulfation means 12 applies an automatic, software commanded, battery de-sulfation process to the battery. IBO 10 may also allow the connection and non-native control external electronic battery de-sulfation device 14 such as a pulse width modulated devices of differing manufacturers, or a non-electronic de-sulfating device 16 such as an automatically injected chemical additive de-sulfation process, or a simple automatic water servicing device. IBO 10 may also provide the means to support bi-directional communications means 19, such as wired or wireless means to bi-directionally transmit battery IBO/DES data, or battery metric data, remote device command and control information, in real time via an Internet based protocol, a telemetry based protocol, a WiFi protocol, or other data communication means. IBO 10 may also be controlled by an external Non-Native Charge Control means 17.

Figure 2A:
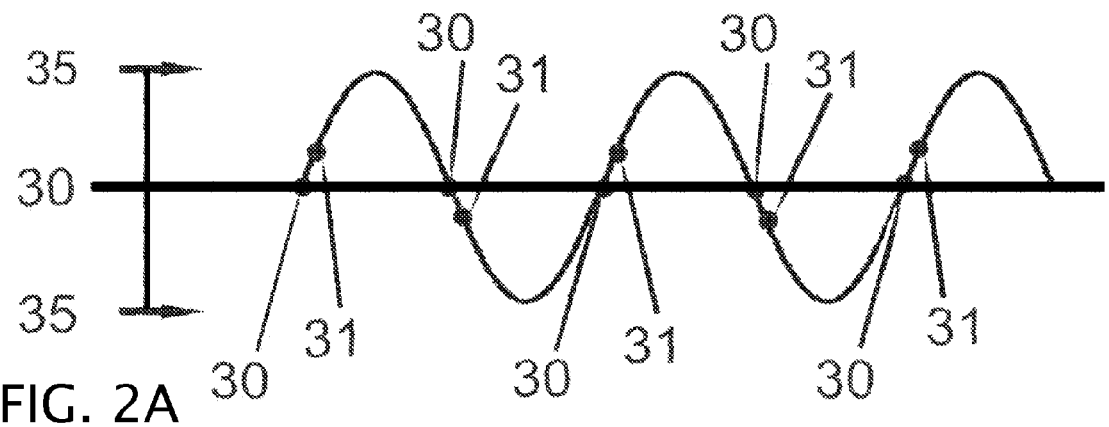

FIG. 2A illustrates the Non-HFISO power supply Capacitor Charging Cycle in the Equilibrium Profile. The charging cycle uses the natural sine wave characteristics of alternating current to provide the means to charge the capacitor using a switch to "clip" or limit the input current cycle at a desired capacitor peak charging current level. The sine wave begins at zero (30) alternating current volts and over time, depending on the battery current requirements and internal battery resistance, may progress up to the maximum peak voltage (35), which may be 120 VAC or 240 VAC as an example.

Figure 3:
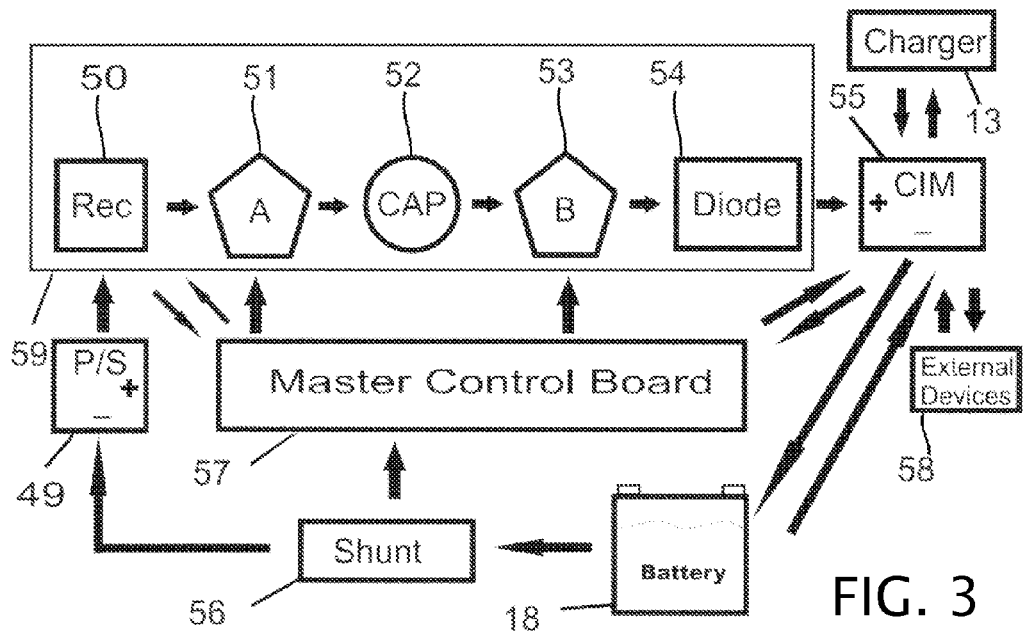
FIG. 3 is a block diagram of a Single Channel Power Pack design used in the integral de-sulfation device.
Figure 4:
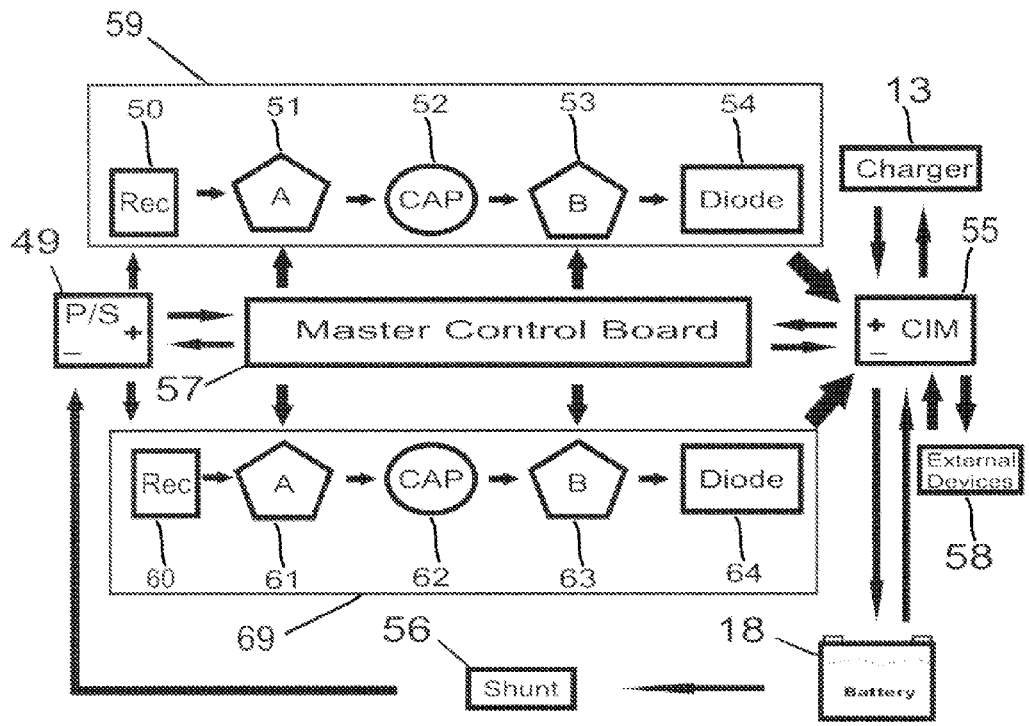
FIG. 4 is a block diagram of a Dual Channel Power Pack design used in the integral de-sulfation device.

As the capacitor charging cycle begins, the alternating current voltage source sine wave measurement begins at the zero voltage point (30), controlled by the closing of internal power pack channel charging input switch 51 of FIG. 3, or 51 and 61 alternatively of FIG. 4; and ends by the opening of switches 51 and/or 51 and 61 by the Master Control board and associated software, using either the measurement of time from the zero point, or the measurement of peak current or voltage along either phase of the sine wave curve. The charging cycle may begin on either the upward or downward phase of the alternating current, but both phases may be used to charge the capacitor(s).

When using the time measurement from zero method, the time analysis by the MCB and associated software begins by the closing of the channel charging input switches at zero (30), charging the capacitor until the end of the time cycle occurs by the opening of the channel charging input switches at timing point (31). In the equilibrium state, each successive charge cycle begins at zero (30) and ends at the software determined time value of (31).

When using the voltage measurement from zero method, the voltage measurement analysis by the MCB and associated software begins by the closing of the channel charging input switches at zero (30), charging the capacitor until the measured voltage of the capacitor charge occurs by the opening of the channel charging input switches at timing point (31). In the equilibrium state, each successive charge cycle begins at zero (30) and ends at the software determined voltage value of (31).

When using the current measurement from zero method, the current measurement analysis by the MCB and associated software begins by the closing of the channel charging input switches at zero (30), charging the capacitor until the measured current of the capacitor charge occurs by the opening of the channel charging input switches at timing point (31). In the equilibrium profile, each successive charge cycle begins at zero (30) and ends at the software determined current value of (31).

Figure 2B:
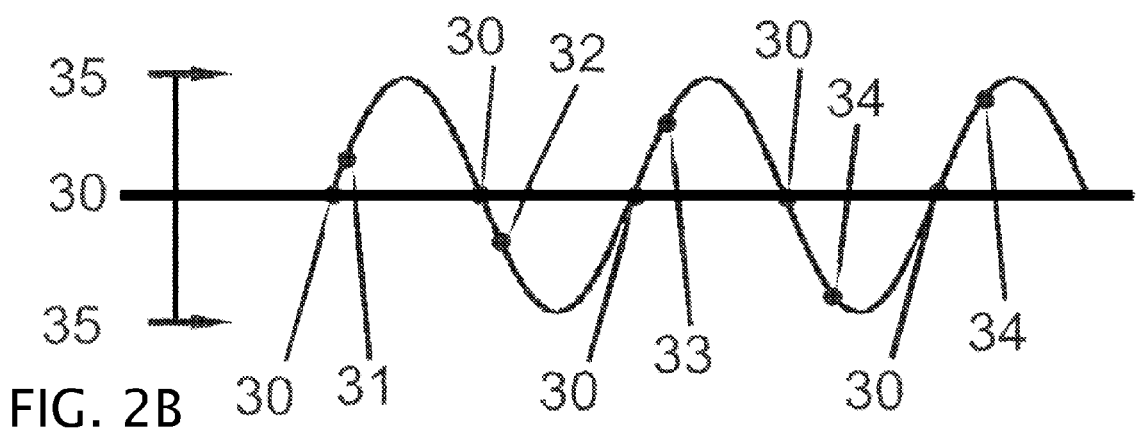

FIG. 2B illustrates the Non-HFISO Capacitor Charging Cycle in the Ramp Up Profile. The charging cycle uses the natural sine wave characteristics of alternating current to provide the means to charge the capacitor using a switch to "clip" (or limit) the current cycle at a desired capacitor peak charging current level. The sine wave begins at zero (30) alternating current/volts and over time, progresses to the target peak desired by the Master Control Board (MCB), or the maximum peak voltage (35), which may be 120 VAC or 240 VAC as an example.

As the capacitor charging cycle begins, the alternating current voltage source sine wave measurement begins at the zero voltage point (30), controlled by the closing of internal power pack channel charging input switch 51 of FIG. 3, or 51 and 61 alternatively of FIG. 4; and ends by the opening of switches 51 and/or 51 and 61 by the Master Control board and associated software, using either the measurement of time from the zero point, or the measurement of peak current or voltage along either phase of the sine wave curve. The charging cycle may begin on either the upward or downward phase of the alternating current, but both phases may be used to charge the capacitor(s). The charging switch remains closed in the charging configuration until the target peak desired by the MCB is attained, or the maximum charge value supplied by the sine wave is reached.

When using the time measurement from zero method, the time analysis by the MCB and associated software begins by the closing of the channel charging input switches at zero (30), charging the capacitor until the end of the time cycle occurs by the opening of the channel charging input switches at timing point 31, 32, 33, 34, and so on. Once the capacitor charge is applied to the battery, the MCB and software compares the measured effect of the discharge upon the battery and the software stored battery target value. In the ramp up profile, each successive charge cycle begins at zero (30) and ends at the software determined upwards time value(s) 32, 33, or 34, and so on, until that applied time provides for equality between the measured battery effect and the target battery effect, or the maximum charge value supplied by the sine wave is reached.

When using the voltage measurement from zero method, the voltage analysis by the MCB and associated software begins by the closing of the channel charging input switches at zero (30), charging the capacitor until the end of the measured voltage cycle occurs by the opening of the channel charging input switches at voltage point 31, 32, 33, 34 and so on. Once the capacitor charge is applied to the battery, the MCB and software compares the measured effect of the discharge upon the battery and the software stored battery target value. In the ramp up profile, each successive charge cycle begins at zero (30) and ends at the software determined upwards voltage value(s) 32, 33, or 34, and so on, until that applied voltage provides for equality between the measured battery effect and the target battery effect, or the maximum charge value supplied by the sine wave is reached.

When using the current measurement from zero method, the current analysis by the MCB and associated software begins by the closing of the channel charging input switches at zero (30), charging the capacitor until the end of the measured current cycle occurs by the opening of the channel charging input switches at voltage point 31, 32, 33, 34 and so on. Once the capacitor charge is applied to the battery, the MCB and software compares the measured effect of the discharge upon the battery and the software stored battery target value. In the ramp up profile, each successive charge cycle begins at zero (30) and ends at the software determined upwards current value(s) 32, 33, or 34, and so on, until that applied current provides for equality between the measured battery effect and the target battery effect, or the maximum charge value supplied by the sine wave is reached.

Figure 2C:
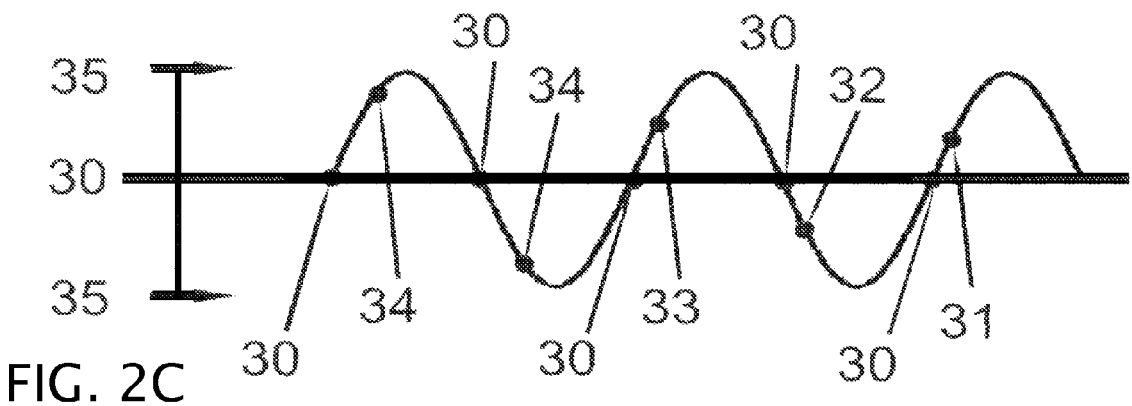

FIG. 2C illustrates the Non-HFISO Capacitor Charging Cycle in the Ramp-Down Profile. The charging cycle uses the natural sine wave characteristics of alternating current to provide the means to charge the capacitor using a switch to "clip" (or limit) the current cycle at a desired capacitor peak charging current level. The sine wave begins at zero (30) alternating current volts and over time, progresses to the target peak desired by the Master Control Board (MCB), or the maximum peak voltage (35), which may be 120 VAC or 240 VAC as an example.

As the capacitor charging cycle begins, the alternating current voltage source sine wave measurement begins at the zero voltage point (30), controlled by the closing of internal power pack channel charging input switch 51 of FIG. 3, or 51 and 61 alternatively of FIG. 4; and ends by the opening of switches 51 and/or 51 and 61 by the Master Control board and associated software, using either the measurement of time from the zero point, or the measurement of peak current or voltage along either phase of the sine wave curve. The charging cycle may begin on either the upward or downward phase of the alternating current, but both phases may be used to charge the capacitor(s).

When using the time measurement from zero method, the time analysis by the MCB and associated software begins by the closing of the channel charging input switches at zero (30), charging the capacitor until the end of the time cycle occurs by the opening of the channel charging input switches at timing point 34, 33, 32, 31, and so on. Once the capacitor charge is applied to the battery, the MCB and software compares the measured effect of the discharge upon the battery and the software stored battery target value. In the ramp down profile, each successive charge cycle begins at zero (30) and ends at the software determined downward time value(s) 34, 33, or 32, and so on, until that applied time provides for equality between the measured battery effect and the target battery effect.

When using the voltage measurement from zero method, the voltage analysis by the MCB and associated software begins by the closing of the channel charging input switches at zero (30), charging the capacitor until the end of the measured voltage cycle occurs by the opening of the channel charging input switches at voltage point 34, 33, 32, 31 and so on. Once the capacitor charge is applied to the battery, the MCB and software compares the measured effect of the discharge upon the battery and the software stored battery target value. In the ramp down profile, each successive charge cycle begins at zero (30) and ends at the software determined downward voltage value(s) 34, 33, or 32, and so on, until that applied voltage provides for equality between the measured battery effect and the target battery effect.

When using the current measurement from zero method, the current analysis by the MCB and associated software begins by the closing of the channel charging input switches at zero (30), charging the capacitor until the end of the measured current cycle occurs by the opening of the channel charging input switches at voltage point 34, 33, 32, 31 and so on. Once the capacitor charge is applied to the battery, the MCB and software compares the measured effect of the discharge upon the battery and the software stored battery target value. In the ramp down profile, each successive charge cycle begins at zero (30) and ends at the software determined downwards current value(s) 34, 33, or 32, and so on, until that applied current provides for equality between the measured battery effect and the target battery effect.

FIG. 3 is a block diagram of the Industrial Battery Optimization System IBO consisting of the integrated Master Control Board (MCB) 57 and Charger Interrupt Module (CIM) 55; showing the connection and control of the internal single channel automatic power pack 59 by the CIM 55 to the battery 18, and the connection and control of an external battery charger 13 by the CIM 55 to the battery 18, and the input of external devices 58 into the CIM 55 where the data may be acted upon directly within the CIM, and/or passed through to the MCB 57 for data processing. If the MCB 57 provides the command to begin the optimization process, MCB 57 interrupts the charger to battery connective means by opening the circuit between charger 13 and battery 18. In the absence of a command to optimize the battery, the MCB 57 provides an un-interrupted connection means between charger 13 and the battery 18.

FIG. 3 shows the flow of the current through the single power pack, beginning with either an isolation transformer power supply (ISO) or a High Frequency—Power Factor Corrected—Switching Isolation Transformer (HFISO) 49. As the battery optimization de-sulfation cycle begins with the battery 18 at a measured battery voltage, the capacitor 52 is at or near zero volts and switch 51 is open preventing the alternating current supply from ISO or HFISO 49 from charging the capacitor 52. Switch 53 may be either open or closed from the previous discharge state. When MCB 57 provides the battery optimization commands, switch 51 and switch 53 are alternatively controlled between the open and closed conditions, in opposing synchronous states.

When the Master Control Board 57 software routine calls for the initial battery optimization de-sulfation cycle to begin, the MCB 57 electrically isolates charger 13 from battery 18 by actuating the Charger Interrupt Module (CIM) 55, which also provides a connective means to electrically couple the internal or external battery de-sulfation means to battery 18.

When the Master Control Board software routine calls for the internal single channel de-sulfation means cycle to begin, MCB 57 begins the initial charge cycle by opening switch 53 to prevent the flow of current from the charging capacitor to the battery. Then MCB 57 closes switch 51 electrically coupling rectifier 50 and capacitor 52, with power supply ISO or HFISO 49, allowing the inrush of an initial software determined default capacitor charging current value that may be measured in amps or milli-amps, or a software determined default timing value from the zero point to a specific point of increased voltage value along the voltage source sine wave, from ISO or HFISO 49, after rectification by rectifier 50, into capacitor 52. Since this is the initial starting charge cycle, there is no battery return data available to MCB 57 that would allow the analysis of the previous capacitor discharge upon the battery, therefore, the software modified and controlled pre-determination of a subsequent "ON State" of switch 51, and the resultant "Charge State" of capacitor 52, is disabled. MCB 57 then allows an initial minimum software determined safe default value of current to be stored within capacitor 52, prior to opening switch 51 terminating the capacitor charge cycle.

To discharge the initial stored charge of capacitor 52 into battery 18, switch 51 is in the open state from the previously completed charge cycle interrupting the input current to capacitor 52, after which MCB 57 closes switch 53 causing capacitor 52 to discharge through switch 53, onwards through diode 54, onwards through a closed power-pack to battery connection means within CIM 55, onwards to battery 18, returning to the power supply ISO or HFISO 49 via shunt 56 completing the discharge cycle.

The initial and subsequent discharge(s) of capacitor 52 into battery 18 may provide battery return data available to MCB 57 allowing an analysis of the previous capacitor discharge effect upon the battery, and therefore, enabling the software modified pre-determination of subsequent "ON State Durations" of switch 51, and the resultant "Variable Charge States" of capacitor 52; to be controlled to match the desired target Peak AMPS applied to the battery. This software modified pre-determined "On State Duration" may be considered in either an increasing charge duration or Ramp Up Profile wherein preceding capacitor charge cycle values are less than subsequent values; a decreasing charge duration or Ramp Down Profile wherein preceding capacitor charge cycle values are greater than subsequent values; or in a State of Equilibrium Profile wherein preceding and subsequent capacitor charge cycle values are approximately equal.

MCB 57 then measures the returned Peak Amps from the battery (Batt-Peak), comparing that value against the stored target value (Batt-Target). If the actual Batt-Peak value is equal to the stored Batt-Target value, then the MCB 57 will apply the identical inrushing capacitor charging current, or charging time period, to capacitor 52 on the next sequential capacitor charging cycle. If the actual Batt-Peak value is less than the stored Batt-Target value, then the MCB 57 will command an increasing "default ramp step up" inrushing current into the capacitor 52 during the next sequential capacitor charging cycle. If the actual Batt-Peak value is greater than the stored Batt-Target value, then the MCB will command a decreasing "default ramp step down" inrushing current into the capacitor 52 during the next sequential capacitor charging cycle. This software enabled ramp up/ramp down process continues until the stored Batt-Target value matches the actual measured Batt-Peak amps of the battery achieving equilibrium, at which time the applied current values to the battery are maintained at the desired target values.

If commanded by the MCB 57 software routine, additional and repetitive charge and discharge cycles are produced by the Single Channel Power Pack system 59 to battery 18, they may effectively produce twice the natural sine wave frequency of the supply current as the Pulse Width Modulated (PWM) "On State." Exemplary internal single channel systems using the non-HFISO power supply system may provide an approximate 0.75 milli-second (ms) "On State" followed by an approximate 9 ms "Off State." When using the ISO power supply, the frequency of the AC Mains Source will determine output frequency of the pulse. As an example, a single channel system may fire two times per sine wave, which at a 50 hz main frequency would be approximately 100 times per second. The single channel system used on a 60 Hz AC Mains Source would be twice per second or approximately 120 times per second. When two single channel systems are combined and fired alternatively, then a 50 Hz AC Mains Source would provide approximately 200 pulses per second, while a 60 Hz AC Mains Source would provide approximately 240 pulses per second. Exemplary internal single channel systems may be varied with respect to "ON" and "OFF" states when using the HFISO power supply, limited by the power supply's ability to provide the reserve capacity of current and voltage to provide the desired pulse frequency.

MCB 57 may control external devices 58, such as non-native de-sulfation means that may include external pulse width modulated devices, special chargers, and liquid additives injection means injecting water or chemical additives into the battery or battery cells. While the algorithms and implementation may vary depending on the differing manufacturing recommendations of the ancillary external devices 58, the use of battery or battery cell metrics to control the application of the external devices in real time may remain the same or similar amongst differing devices.

MCB 57 may use of external input devices 58 such probes or sensors to measure and collect vital battery or battery cell metrics in real time. While the data formats, algorithms and bi-directional communications means may vary depending on the differing manufacturing recommendations of the ancillary external input devices 58, the use of battery or battery cell metrics provided by those external input devices in real time may remain the same or similar amongst differing devices.

MCB 57 may use of external communication devices 58 such as wired or wireless means to bi-directionally transmit battery IBO/DES data, or battery metric data, remote device command and control information, in real time via an Internet based protocol, a telemetry based protocol, a WiFi protocol, or other data communication means. While the data formats, algorithms and bi-directional communications means may vary depending on the differing manufacturing recommendations of the external communication devices 58, the use of battery or battery cell metrics bi-directionally communicated may remain the same or similar amongst differing devices.

While the use of the Peak Amps battery or battery cell metric is exemplary, it is understood that other battery or cell metrics such as voltage or impedance could be substituted for Peak Amps, or used in combination with Peak Amps, or any combination of battery or cell metrics could be used to enable the software controlled and automated "On State Charge Cycle Durations."

FIG. 4 is a block diagram of the IBO system consisting of the integrated Master Control Board (MCB) 57 and Charger Interrupt Module (CIM) 55; showing the connection and control of the internal, dual channel automatic power packs 59 and 60, by CIM 55 to the battery 18, and the connection and control of an external battery charger 13 by the CIM 55 to the battery 18, and the input of external devices 58 into the CIM 55 where the data may be acted upon directly within the CIM, and/or passed through to the MCB 57 for data processing. If the MCB 57 provides the command to begin the optimization process, MCB 57 interrupts the charger to battery connective means by opening the circuit between charger 13 and battery 18. In the absence of a command to optimize the battery, the MCB 57 provides an un-interrupted connection means between charger 13 and the battery 18.

FIG. 4 shows the flow of the current through the alternately combined and controlled, individual single power packs, of the Dual Channel Power Pack system. The flow of current begins with either an isolation transformer (ISO) or a High Frequency—Power Factor Corrected—Switching Isolation Transformer (HFISO) 49. As the battery optimization de-sulfation cycle begins with the battery 18 at a measured battery voltage, the capacitors 52 and 62 are at zero volts and switch 51 and 61 are open preventing the alternating current supply from ISO or HFISO 49 from charging the capacitors. Switches 53 and 63 may be either open or closed from the previous discharge state. When MCB 57 provides the battery optimization commands, switch 51 and switch 53 of channel 59 are alternatively controlled between the open and closed conditions, in opposing synchronous states. Correspondingly and in an alternating and opposing channel output phase relationship, the MCB commands switch 61 and switch 63 of channel 69 to alternatively be controlled between the open and closed conditions, in opposing synchronous or asynchronous states.

When the Master Control Board 57 software routine calls for the initial battery optimization de-sulfation cycle to begin, the MCB 57 electrically isolates charger 13 from battery 18 by actuating the Charger Interrupt Module (CIM) 55, which also provides a connective means to electrically couple the internal or external battery de-sulfation means to battery 18.

When the Master Control Board software routine calls for the internal dual channel de-sulfation means cycle to begin, MCB 57 begins the initial charge cycle by opening switch 53 of channel 59, to prevent the flow of current from the charging capacitor to the battery. Then MCB 57 closes switch 51 of channel 59 electrically coupling rectifier 50 and capacitor 52, with power supply ISO or HFISO 49, allowing the inrush of an initial software determined default capacitor charging current value that may be measured in amps or milli-amps, or a software determined default timing value from the zero point to a specific point of increased voltage value along the voltage source sine wave, from ISO or HFISO 49 after rectification by rectifier 50, into capacitor 52. Since this is the initial starting charge cycle, there is no battery return data available to MCB 57 that would allow the analysis of the previous capacitor discharge upon the battery, therefore, the software modified and controlled pre-determination of a subsequent "ON State" of switch 51, and the resultant "Charge State" of capacitor 52, is disabled. MCB 57 then allows an initial minimum software determined safe default value of current to be stored within capacitor 52 of channel 59, prior to opening switch 51 terminating the capacitor charge cycle.

Once the MCB has determined that channel 59, capacitor 52 has completed the charge cycle, the dual channel software routine calls for the initial charge cycle of channel 69 by opening switch 63 of channel 60, to prevent the flow of current from the charging capacitor to the battery. Then MCB 57 closes switch 61 of channel 69 electrically coupling rectifier 60 and capacitor 62, with power supply ISO or HFISO 49, allowing the inrush of an initial software determined default capacitor charging current value that may be measured in amps or milli-amps, or a software determined default timing value from the zero point to a specific point of increased voltage value along the voltage source sine wave, from ISO or HFISO 49 after rectification by rectifier 50, into capacitor 62. Since this is the initial starting charge cycle, there is no battery return data available to MCB 57 that would allow the analysis of the previous capacitor discharge upon the battery, therefore, the software modified and controlled pre-determination of a subsequent "ON State" of switch 61, and the resultant "Charge State" of capacitor 62, is disabled. MCB 57 then allows an initial minimum software determined safe default value of current to be stored within capacitor 62 of channel 69, prior to opening switch 61 terminating the capacitor charge cycle.

To discharge the initial stored charge of channel 59, capacitor 52 into battery 18; MCB 57 must first command switch 63 of channel 69 to remain open preventing channel 59 and channel 69 from discharging simultaneously into battery 18. Once the MCB determines that output switch 63 of channel 69 is open and switch 51 of channel 59 has remained in an open state from the previously completed charge cycle, then MCB 57 may close switch 53 causing capacitor 52 to discharge through switch 53, onwards through diode 54, onwards through a closed power-pack to battery connection means within CIM 55, onwards to battery 18, returning to the power supply ISO or HFISO 49 via shunt 56 completing the discharge cycle. Once channel 59 has discharged, MCB 57 opens switch 53 of channel 59 to begin the repetitive charging cycle of channel 59, asynchronous to channel 69.

To discharge the initial stored charge of channel 69, capacitor 62 into battery 18; MCB 57 must first command switch 53 of channel 59 to remain open preventing channel 59 and channel 69 from discharging simultaneously into battery 18. Once the MCB determines that output switch 53 of channel 59 is open and switch 61 of channel 69 has remained in an open state from the previously completed charge cycle, then MCB 57 may close switch 63 causing capacitor 62 to discharge through switch 63, onwards through diode 64, onwards through a closed power-pack to battery connection means within CIM 55, onwards to battery 18, returning to the power supply ISO or HFISO 49 via shunt 56 completing the discharge cycle. Once channel 69 has discharged, MCB 57 opens switch 63 of channel 69 to begin the repetitive charging cycle of channel 69, asynchronous to channel 59.

The initial and subsequent discharge(s) of capacitor 52 of channel 59 and capacitor 62 of channel 69, into battery 18, may provide battery return data available to MCB 57 allowing an analysis of the previous capacitor discharge effect upon the battery, and therefore, enabling the software modified pre-determination of subsequent "ON State Durations" of switch 51 and 61, and the resultant "Variable Charge States" of capacitor 52 and 62; to be controlled to match the desired target Peak AMPS applied to the battery. This software modified pre-determined "On State Duration" may be considered in either an increasing charge duration or Ramp=Up Profile wherein preceding capacitor charge cycle values are less than subsequent values; a decreasing charge duration or Ramp Down Profile wherein preceding capacitor charge cycle values are greater than subsequent values; or in a State of Equilibrium Profile wherein preceding and subsequent capacitor charge cycle values are approximately equal.

MCB 57 then measures the returned Peak Amps from the battery (Batt-Peak), comparing that value against the stored target value (Batt-Target). If the actual Batt-Peak value is equal to the stored Batt-Target value, then the MCB 57 will apply the identical inrushing capacitor charging current, or charging time period, to capacitor 52 and 62 on the next sequential capacitor charging cycle. If the actual Batt-Peak value is less than the stored Batt-Target value, then the MCB 57 will command an increasing "default ramp step-up" inrushing current into the capacitor 52 and 62 during the next sequential capacitor charging cycle. If the actual Batt-Peak value is greater than the stored Batt-Target value, then the MCB 57 will command a decreasing "default ramp step down" inrushing current into the capacitor 52 and 62 during the next sequential capacitor charging cycle. This software enabled ramp up/ramp down process continues until the stored Batt-Target value matches the actual measured Batt-Peak amps of the battery achieving equilibrium, at which time the applied current values to the battery are maintained at the desired target values.

If commanded by the MCB 57 software routine, additional and repetitive charge and discharge cycles produced by the Dual Channel Power Pack system, a combination and alternatively synchronously charged and discharged single channel power packs 59 and 69, to battery 18, they may effectively produce four times the natural sine wave frequency of the supply current as the Pulse Width Modulated (PWM) "On State." The effective discharge rate of dual channel systems comprised of two alternately synchronous or asynchronous individual channels may be an approximate 0.75 milli-second (ms) "On State" followed by an approximate 4.5 ms "Off State."

MCB 57 may control external devices 58, such as non-native de-sulfation means that may include external pulse width modulated devices, special chargers, and liquid additives injection means injecting water or chemical additives into the battery or battery cells. While the algorithms and implementation may vary depending on the differing manufacturing recommendations of the ancillary external devices 58, the use of battery or battery cell metrics to control the application of the external devices in real time may remain the same or similar amongst differing devices.

MCB 57 may use of external input devices 58 such probes or sensors to measure and collect vital battery or battery cell metrics in real time. While the data formats, algorithms and bi-directional communications means may vary depending on the differing manufacturing recommendations of the ancillary external input devices 58, the use of battery or battery cell metrics provided by those external input devices in real time may remain the same or similar amongst differing devices.

MCB 57 may use of external communication devices 58 such as wired or wireless means to bi-directionally transmit battery IBO/DES data, or battery metric data, remote device command and control information, in real time via an Internet based protocol, a telemetry based protocol, a WiFi protocol, or other data communication means. While the data formats, algorithms and bi-directional communications means may vary depending on the differing manufacturing recommendations of the external communication devices 58, the use of battery or battery cell metrics bi-directionally communicated may remain the same or similar amongst differing devices.

While the use of the Peak Amps battery or battery cell metric is exemplary, it is understood that other battery or cell metrics such as voltage or impedance could be substituted for Peak Amps, or used in combination with Peak Amps, or any combination of battery or cell metrics could be used to enable the software controlled and automated "On State Charge Cycle Durations."

Figure 5:
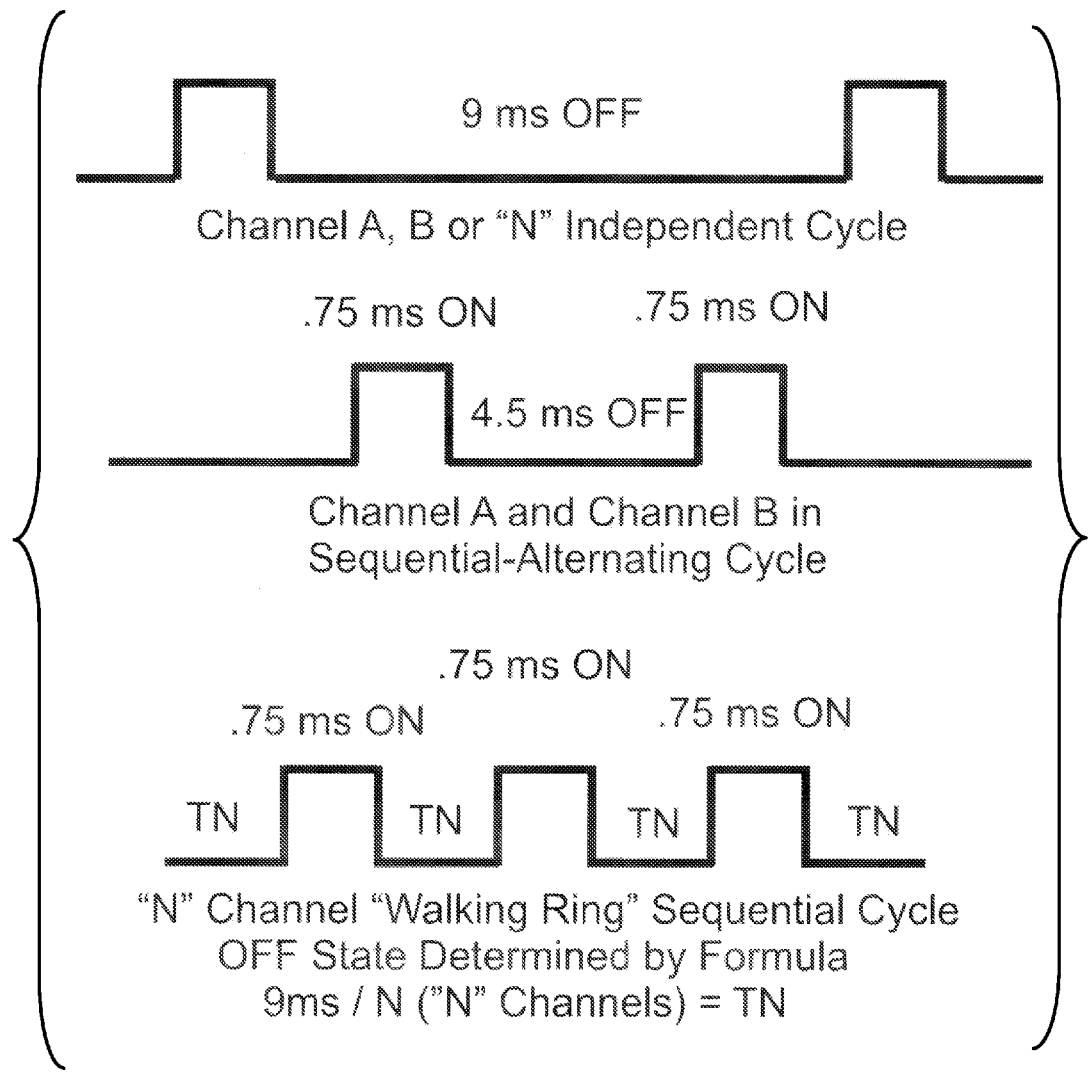
FIG. 5 is a diagram of the Fixed Pulse Width Frequency used in the integral de-sulfation device.

FIG. 5 shows that in some exemplary embodiments, a de-sulfating current pattern supplied to a battery may include a repeating pattern of an "On" pulse followed by a "Resting or Off" period. For example, an exemplary single channel de-sulfating current pattern supplied to battery 18 may include a repeating sequence of an about 0.75 millisecond (ms) on pulse followed by an about 9 ms off period. An exemplary dual channel de-sulfating current pattern supplied to battery 18 may include a repeating sequence of an about 0.75 millisecond (ms) on pulse followed by an effective 4.5 ms off period. The durations of the various exemplary pulses and resting periods described herein are merely examples only, and it is within the scope of the disclosure to modify the durations of any on pulses and/or off periods discussed herein.

FIG. 6A shows the measurement in milli-ohms of the accumulation of daily excess sulfation of a non-optimized battery over a representative 12-month operational period. The illustrated increase is linear over a 12-month period; however, actual measurable battery sulfate accretion rates may be non-linear with respect to time. As the sulfation induced impedance increases, the corresponding performance of the battery decreases and the battery at the 12-month interval requires a de-sulfation service to restore or re-generate the battery. Operational factors such as temperature, the re-occurring depth of discharge the battery endures, the workloads performed, and the charger types and processes are some of the factors that contribute to differing rates of sulfation.

FIG. 6B shows the measurement in milli-ohms of the accumulation of daily excess sulfation of an optimized battery over a representative 12-month operational period. When compared to the non-optimized battery represented by FIG. 6A, the sulfation induced impedance of the optimized battery is far less resulting in a lower loss of performance with the optimized battery remaining serviceable without the need for a de-sulfation service.

FIG. 7A shows the Loss of Runtime of a non-optimized battery. As the impedance of the non-optimized battery (FIG. 6A) increases, there is a corresponding loss of runtime expressed in hours of use per charge. The battery begins the annual cycle with a low impedance and a 5-hour runtime, as the battery impedance increase it results in a corresponding decrease in the battery's runtime until about the $12^{th}$ month, when the battery has 50% of the capacity it had in the $1^{st}$ month of operation.

FIG. 7B shows the Loss of Runtime of an optimized battery. As the impedance of the optimized battery (FIG. 6B) increases slightly, there is a corresponding slight loss of runtime expressed in hours of use per charge. The battery begins the annual cycle with low impedance and a 5-hour runtime, and since the battery is de-sulfated on a daily or other shortened periodic basis; the battery impedance increase is minimal resulting in a minimal decrease in the battery runtime in month 12.

FIG. 8 shows the data example of a Ramp-Up Charge to the Capacitor with a 100-amp peak-to-peak target value delivered through the battery. The data assumes that the internal battery resistance remains constant during the application of the peak amperage.

The Cycle 1 default initiating 200 milli-amp capacitor charge is applied to the battery resulting in a zero peak amps indication upon the battery.

During Cycle 2, the MCB may then apply an additional 200 milli-amp default peak value increase to the Cycle 1 initiating value of 200 milli-amps, therefore applying 400 milli-amps to the battery, again resulting in a zero peak amps indication.

During Cycle 3, the MCB may then apply an additional 200 milli-amp default peak value increase to the Cycle 2 value, therefore applying 600 milli-amps to the battery, again resulting in a zero peak amps indication.

During Cycle 4, the MCB may then apply an additional 200 milli-amp default peak value increase to the Cycle 3 value, therefore applying 800 milli-amps to the battery, again resulting in a zero peak amps indication.

During Cycle 5, the MCB may then apply an additional 200 milli-amp default peak value increase to the Cycle 4 value, therefore applying 1000 milli-amps to the battery, resulting in a 30-peak amps indication.

During Cycle 6, the MCB may then apply an additional 200 milli-amp default peak value increase to the Cycle 5 value, therefore applying 1200 milli-amps to the battery, resulting in a 60-peak amps indication.

During Cycle 7, the MCB may then apply an additional 200 milli-amp default peak value increase to the Cycle 6 value, therefore applying 1400 milli-amps to the battery, resulting in a 90-peak amps indication.

During Cycle 8, the MCB may then apply an additional 200 milli-amp default peak value increase to the Cycle 7 value, therefore applying 1600 milli-amps to the battery, resulting in a 120-peak amps indication, which is beyond the targeted value of 100 amps peak.

During Cycle 9, the MCB may then reduce the previous Cycle 8 applied 200 milli-amp default peak value increase downwards to a 100 milli-amp applied peak value to the Cycle 7 value, therefore applying 1500 milli-amps to the battery, resulting in a 110-peak amps indication, which is beyond the targeted value of 100 amps peak.

During Cycle 10, the MCB may then reduce the previous Cycle 8 applied 100 milli-amp default peak value increase downwards to a 50 milli-amp applied peak value to the Cycle 7 value, therefore applying 1450 milli-amps to the battery, resulting in a 100-peak amps indication, which equals the targeted value of 100 amps peak.

During Cycle 11 and Cycle 12, the data table shows that the MCB continues to sample the applied peak amps to determine the input values of the capacitor charging cycle.

FIG. 9 shows the data example of a Ram-Up or Ramp-Down Capacitor Charging Cycle, assuming a real time lowering of the battery's internal resistance, resulting from the reduction of sulfation when using the IBO/DES system. As the data table samples begin, Cycle 1 and 2 show that when the battery has 10 milli-ohms of resistance, that the applied input current to the capacitor of 1.45 amps at 12.8 VDC, creates a 100 amp peak-to-peak pulse current within the battery.

In Cycle 3, as the internal resistance caused by sulfation diminishes to 9 milli-ohms at the same applied current level, the voltage rises to 12.9 VDC and the Peak Pulse rises to 110 amps peak-to-peak. When the MCB senses that the peak-to-peak amplitude changes, then the software driven device will make comparative changes to the capacitor charging system to either reduce or increase the capacitor stored current. In this data example the peak amps have risen, so the MCB will issue a Ramp Down command to the capacitor switching means, lowering the current allowed to enter the capacitor on the subsequent charging cycle.

Since the desired peak-to-peak amplitude was set at 100 amps and the actual peak amps during discharge cycle 3 were 110, then the MCB must reduce the capacitor charging current. The MCB will reduce the input current to the capacitor at the default step down value, in this case 200 milli-amps, and monitor the change in the peak amplitude during the net sequential cycle.

After the previous Ramp Down charge current correction, Cycle 4 shows that the voltage dropped slightly, while the peak amps decreased to 90 peak. Attempting to maintain the 100-amp peak and considering the unique nature of each (this) battery, the MCB and operating software must calculate the subsequent cycle 5 applied Input Current to Capacitor value. The decrease of 200 milli-amps from the capacitor input current of Cycle 4 resulted in a 20-peak amp decrease, which was below the target value of 100 peak amps. The MCB will increase the input current to the capacitor during Cycle 5 to reach the target value of 100 peak amps. If the Peak change of 20 was caused by a change of 200 milli-amps, then every 10 peak change would require a change to the capacitor input charge current of 100 milli-amps. Therefore, a change from 90 the measured peak to the target peak of 100 would require an increase in the capacitor charge current of +100 milli-amps.

The Cycle 5 capacitor input charge current is therefore 1.25 amps+100 milli-amps, or 1.35 amps. As the data table shows, once the Cycle 5 capacitor input charge current was set at 1.35 amps, the resulting battery measured peak amps was 100, which equals the target peak amps.

Cycle 6 shows that there is no sulfation induced impedance reduction from Cycle 5.

Cycle 7 shows that there is no sulfation induced impedance reduction from Cycle 5, so the capacitor input charge current remains the same.

Cycle 8 shows that there is a sulfation induced change in the battery's impedance from 9 milli-ohms to 8 milli-ohms, requiring another change in the applied capacitor input charge current.

Cycle 9 shows the reduction of the capacitor input charge current of 200 milli-amps has been applied to the battery, resulting in a change that is below the target value.

Cycle 10 has another calculated increase in the capacitor input charge current of 100 milli-amps, which results in the battery measured peak amps being equal to the target peak amps.

Cycle 11 and 12 show that if there is no continuing change in sulfation induced resistance, then the voltage, battery peak amps remain the same may indicate the conclusion of the process.

While peak-to-peak amplitude was illustrated, it is understood that the same example could be shown with the substitution of volts or time from zero as the capacitor charging current controlling means, with similar changes in the data table numerical values.

FIG. 10 shows an example embodiment of a BattSmart Device 100, that easily accommodates the shape of industrial battery cell interconnection link, an industrial battery interconnection link retention bolt, an industrial battery interconnection link round terminal, a common battery terminal post, or other cell or battery terminal connection means, or cell electrolyte conduction means. The device consists of a non-conductive molded or machined body 101, with an integral molded or machined passageways, that accommodate several different sizes and styles of industrial battery cell-to-cell interconnection Kelvin type probes, other cell-to-cell or battery-to-battery connections means including cell-to-cell electrolyte means, or cell to ancillary device and/or battery to ancillary device connection means, or the specific gravity optical digitizer. The body 101 has molded or machined passages that house numerous pairs of Kelvin type connections such as pairs 200 and 201, separate and electrically isolated conductive electrodes 230, 235, 240 and 245 and their respective attachment means. Electrodes 230, 235, 240, and 245 are acted upon by individual springs, or alternative pressure applying devices, 270, 271, 272, and 273, to provide an adjustable contact means between battery and/or battery cell types. The spring pressure or alternative devices may provide a positive surface contact pressure to the cell terminal or interconnection means. Probe insulation devices 241, 242, 243 and 244 may be used to electrically insulate the contact electrodes 230, 235, 240 and 245 from springs, 270, 271, 272, and 273. An alternative embodiment may locate the pressure springs or alternative devices above or internal to the support mechanism 101. An alternative embodiment may use a fixed connections means such as conventional bolts and nuts, rather than an adjustable contact means.

For illustrative clarity, FIG. 10 shows the following description refers to only one electrode assembly, 230 and associated connecting parts, while the remaining electrodes 235, 240 and 245, have identical relationships with their corresponding parts. With respect to electrode 230, electrode retention device 250 and 260 retain spring 270 and electrode 230 within the support means 101. The movement allowed by the spring action compensates for the vertical misalignment of cell terminal posts, or other interconnection means, when the device is placed upon an array of cells with irregular battery heights. The sharpened tip 275, of electrode 230 is designed to penetrate the soft lead surface area of a typical battery terminal or interconnection means, penetrate interconnecting cable insulation, or provide surface contact to non-penetrating surface interconnecting means. The degree of spring compression determines the amount of force applied from BattSmart support means 101 to the sharpened tip 275, which can be adjusted without changing the measured length of the electrode by adding a spacer. The addition or reduction of spring or other applied pressure means may have a calibration affect upon the raw data measurement. As shown in FIG. 10, the use of a non-conductive separator 265 electrically isolates the remaining portion of the electrode from the battery or battery cell interconnection means, resulting in only the exposed tip coming into contact with the interconnecting means. Referring to FIG. 10, retention device 255 retains and electrically couples contact tab 215 to electrode 230. Contact tab 215 is bi-directionally electronically coupled to receiving terminal 221 of the stationary (non-flexible) conductive means (printed circuit board) 110, using the non-stationary (flexible) conductive means 231 comprised of special RFI, RMI or electrical noise reducing materials or processes.

FIG. 10 shows conductive means 130 is physically attached to stationary means 110 and connector 120, physically and electrically coupled to electrode 230 by connector 221 and flexible means 231.

FIG. 10 shows conductive means 131 is physically attached to stationary means 110 and connector 120, physically and electrically coupled to electrode 235 by connector 222 and flexible means 232 comprised of special RFI, RMI or electrical noise reducing materials or processes.

FIG. 10 shows conductive means 132 is physically attached to stationary means 110 and connector 120, physically and electrically coupled to temperature sensor 330 by connector 223 and a flexible means 335.

FIG. 10 shows conductive means 133 is physically attached to stationary means 110 and connector 120, physically and electrically coupled to an immersion type of Kelvin probe element 310 by connector 224 and a flexible means 315.

FIG. 10 shows conductive means 134 is physically attached to stationary means 110 and connector 120, physically and electrically coupled to an immersion type of Kelvin probe element 320 by connector 225 and a flexible means 325.

FIG. 10 shows conductive means 135 is physically attached to stationary means 110 and connector 120, physically and electrically coupled to a Specific Gravity Optical Digitizing device processor 480, of SGOD device 400, by connector 226 and a flexible means 485. Conductive means 135 may consist of more than one discrete, bi-directional conductor connected to light source 410 and light receiver 420, of SGOD 400. Circuit board 401 supports and positions the combination of light source and light receiver in a vertically oriented light bar array, physically embedded within an acid resistant transparent or translucent encapsulation means of probe body 300. The preferred SGOD device embodiment may have a disk 430 with an approximate specific gravity of 1.100. The preferred SGOD device embodiment may have a disk 440 with an approximate specific gravity of 1.200. The preferred SGOD device embodiment may have a disk 450 with an approximate specific gravity of 1.225. The preferred SGOD device embodiment may have a disk 460 with an approximate specific gravity of 1.265. The preferred SGOD device embodiment may have a disk 470 with an approximate specific gravity of 1.300. The preferred SGOD device embodiment may have a retention element 475 to provide a physical limitation to the vertical positioning of the disks.

FIG. 10 shows conductive means 136 is physically attached to stationary means 110 and connector 120, physically and electrically coupled to a electrolyte fluid control valve 510, of fluid control device 500 by connector 227 and a flexible means 515. Fluid Control Device 500 may consist of a fluid filling or removal tube 530, connected to a fluid control valve 510, connected to external apparatus adapter 520.

FIG. 10 shows conductive means 137 is physically attached to stationary means 110 and connector 120, physically and electrically coupled to electrode 240 by connector 228 and a flexible means 233 comprised of special RFI, RMI or electrical noise reducing materials or processes. Conductive means 138 is physically attached to stationary means 110 and connector 120, physically and electrically coupled to electrode 245 by connector 229 and flexible means 234 comprised of special RFI, RMI or electrical noise reducing materials or processes.

FIG. 10 shows the relative positioning of the conductive means 130, 131, 132, 133, 134, 135, 136, 137 and 138, or any additional conductive means on the stationary conductive means 110, is in a manner that may reduce the effects of electrical noise and magnetic or RFI interference. The conductive means (PCB) 110 may have a top and bottom layered shielding means of solid copper, or another shielding processes, to reduce electrical noise or magnetic or RFI interference, FIG. 10 illustrates the first conductive electrode 230 with an integral contact point 275, the second conductive electrode 235 with an integral contact point 276, the third conductive electrode 240 with an integral contact point 277, and the fourth conductive electrode 245 with an integral contact point 278

FIG. 10 shows an integral temperature-measuring probe sensor 330 physically embedded within an acid resistant transparent or translucent encapsulation means of probe body 300. Sensor 330 is physically and electrically coupled to conductive means 335, which is bi-directionally electronically coupled to receiving terminal 223 of the stationary (non-flexible) conductive means (printed circuit board) 110. The sensor is thermally conductive with the battery or battery cell electrolyte, when probe 300 is immersed within the electrolyte.

FIG. 11 illustrates the cross sectional view of the exemplary Specific Gravity Optical Digitizer (SGOD). The exemplary embodiment of SGDO 300 consists of a specially formulated encapsulation means 301 that may be machined using acid resistant material, or of a molded design using acid resistant materials to encapsulate the internal components. The encapsulation means physically supports provides for the correct orientation and seals the internal components from the damaging effects of acid.

FIG. 11 shows a light bar type of apparatus 400 that consists of a stationary conductive means 401 that may be comprised of a printed circuit board, a series of opposing and adjacent light emitting devices (LED's) 410 thru 419 and light receiving devices (LRD) 420 thru 429, a processing unit 480, conductive means 490 and 495 for each adjacent pairs of LED and LRD's, floatation reflective devices 430, 440, 450, 460 and 470, a conductive means 485 between the processor and the instrumentation or computer system, and a floatation retention device 475.

FIG. 11 shows printed circuit board 401 with processor 480 connected by conductive means 490 to LED 419, and processor 480 connected by conductive means 495 to LRD 429. For illustrative clarity, only these two connections are shown, but it is understood and intended that each LED shall have at least one connective means to the processor 480; accordingly each LRD shall also have at least one connective means to the processor 480. The conductive means may provide for the bi-directional electrical coupling of each LED and LRD, to the processor 480.

FIG. 11 shows LED 410 opposite an adjacent to LRD 420. Also shown is LED 411 adjacent to LRD 421, LED 412 adjacent to LRD 422, LED 413 adjacent to LRD 423, LED 414 adjacent to LRD 424, LED 415 adjacent to LRD 425, LED 416 adjacent to LRD 426, LED 417 adjacent to LRD 427, LED 418 adjacent to LRD 428, and LED 419 adjacent to LRD 429. While ten combinations of LED and LRD are illustrated, it is understood and intended that more or less combined pairs of LED and LRD devices may be used in an exemplary device. The LED's 410 thru 419 may provide a constant light emission, or a sequentially commanded light emission, that until reflected by a passing reflective disk is disbursed within the electrolyte fluid with little or no measurable reflection onto the adjacent LRD. An alternative method of LED to LRD orientation may be used that does not require adjacent pairs for the LED and LRD, but rather a layout with more or less LED's than LRD's.

FIG. 11 shows floatation reflective devices 430, 440, 450, 460 and 470 stacked in a vertical array below the light bar. While 5 floatation devices are shown, it is understood and intended that more or less reflective flotation devices may be used of varying specific gravity construction. In an exemplary device, floatation device 430 is formulated from acid resistance material to a specific gravity of approximately 1.100, commonly accepted as the specific gravity of water. The remaining floatation devices 440, 450, 460, 470, may be formulated with ever-increasing specific gravities, with the largest value at the bottom and each ascending floatation device having a lower specific gravity value than the predecessor. The floatation devices are designed with a size, shape, color, and density to effectively reflect the maximum amount of light in a discrete manner from the LED only onto a corresponding LRD. When device 300 is in a vertical position and immersed within the battery electrolyte fluid, floatation retention device 475 prevents the floatation devices from falling off of device 300 into the electrolyte and is easily removed to allow replacement, cleaning or re-calibration of the floatation devices.

In an exemplary SGOD, probe assembly 300 is immersed within an electrolyte fluid of a battery cell. All of the LED devices 410 thru 419 may be continuously illuminated, or sequentially staged by processor command. There is no electrical output from the LRD devices until light is reflected onto them. As the floatation device(s) pass the LED/LRD combination, ever increasing light is reflected from the LED onto the LRD, until the maximum reflection is achieved when the floatation device is exactly centered on the LED/LRD position. As the reflective floatation device travels beyond the exact center of the LED/LRD combination, the degree of reflected light from the LED to the LCD begins to diminish until there is no reflected light received by the LRD.

Once the floatation devices are contacted by the electrolyte, the floatation devices that can be fully supported by the specific gravity of the fluid float to the top of the vertical stack up, passing by each combination of LED and LRD on printed circuit board 401. The specific gravity of a fluid based electrolyte may always be greater than 1.100, therefore, floatation device 430 may always float to the electrolyte's surface providing an electrolyte level cell metric. As device 430 is acted upon by a fluid with a specific gravity greater than the material construction of device 430, the device begins to float upwards past the combinations of LED and LRD devices reflecting light emitted from the LED it passes, onto the LRD of the corresponding pair, signaling the floatation devices position on the light bar and a corresponding specific gravity can be calculated using software algorithms within the processor. As an example of an exemplary system, processor 480 provides a constant light source voltage and current to LED 419 providing a constant illuminated source of light that can only be reflected onto LRD 429 when the floatation devices pass in front of the LED/LRD combination. This reflected light causes the LRD to either independently create an analogue signal, or amplifies or diminishes (conditions or modifies) an analog signal sent from the processor 480, via conductive means 495 to LRD 429 through the LRD device. The modified signal is returned to processor 480 and the position of the floatation disk can then be determined.

As device 440 is acted upon by a fluid with a specific gravity greater than the material construction of device 440, the device begins to float upwards past the combinations of LED and LRD devices reflecting light emitted from the LED it passes, onto the LRD of the corresponding pair, signaling the floatation devices position on the light bar and a corresponding specific gravity can be calculated using software algorithms within the processor.

As device 450 is acted upon by a fluid with a specific gravity greater than the material construction of device 450, the device begins to float upwards past the combinations of LED and LRD devices reflecting light emitted from the LED it passes, onto the LRD of the corresponding pair, signaling the floatation devices position on the light bar and a corresponding specific gravity can be calculated using software algorithms within the processor.

As device 460 is acted upon by a fluid with a specific gravity greater than the material construction of device 460, the device begins to float upwards past the combinations of LED and LRD devices reflecting light emitted from the LED it passes, onto the LRD of the corresponding pair, signaling the floatation devices position on the light bar and a corresponding specific gravity can be calculated using software algorithms within the processor.

The processor unit 480 may consist of hardware such as a programmable processor, memory input/output means and associated circuitry, and a software program to provide a means to convert the raw analogue floatation device position along the light bar, into digital specific gravity data that can be used by instrumentation or a computer based system. The raw analogue signal may be conditioned or amplified by an electronic circuit either within or prior to processor 480. The processor board may have an integral temperature sensing device that provides temperature data the processor may use to compensate floatable disk data to temperature compensated disk data.

FIG. 12 illustrates the cross sectional view of the cylindrical design Specific Gravity Optical Digitizer (SGOD). The exemplary embodiment of SGDO 300 consists of a specially formulated encapsulation means 301 that may be machined using acid resistant material, or of a molded design using acid resistant materials to encapsulate the internal components. The encapsulation means physically supports provides for the correct orientation and seals the internal components from the damaging effects of acid.

FIG. 12 shows a dual light bar type of apparatus 400 that consists of two stationary conductive means 401 that may be comprised of a printed circuit board, a series of opposing and adjacent light emitting devices (LED's) 410 thru 419 and light receiving devices (LRD) 420 thru 429, a processing unit 480, conductive means 490 and 495 for each adjacent pairs of LED and LRD's, floatation light blocking devices 430, 440, 450, 460 and 470, a conductive means 485 between the processor and the instrumentation or computer system, and a floatation retention device 475.

FIG. 12 shows printed circuit board 401 with processor 480 connected by conductive means 490 to LED 419, and processor 480 connected by conductive means 495 to LRD 429. For illustrative clarity, only these two connections are shown, but it is understood and intended that each LED shall have at least one connective means to the processor 480; accordingly each LRD shall also have at least one connective means to the processor 480. The conductive means may provide for the bi-directional electrical coupling of each LED and LRD, to the processor 480.

FIG. 12 shows LED 410 opposite to LRD 420. Also shown is LED 411 opposite to LRD 421, LED 412 opposite to LRD 422, LED 413 opposite to LRD 423, LED 414 opposite to LRD 424, LED 415 opposite to LRD 425, LED 416 opposite to LRD 426, LED 417 opposite to LRD 427, LED 418 opposite to LRD 428, and LED 419 opposite to LRD 429. While ten combinations of LED and LRD are illustrated, it is understood and intended that more or less combined pairs of LED and LRD devices may be used in an exemplary device. The LED's 410 thru 419 may provide a constant light emission, or a sequentially commanded light emission, that until blocked by a passing reflective ball, the light is in full contact with the opposite LRD. An alternative method of LED to LRD orientation may be used that does not require opposite pairs for the LED and LRD, but rather a layout with more or less LED's than LRD's.

FIG. 12 shows floatation reflective light blocking devices 430, 440, 450, 460 and 470 stacked in a vertical array below the light bar. While 5 floatation devices are shown, it is understood and intended that more or less reflective flotation devices may be used of varying specific gravity construction. In an exemplary device, floatation device 430 is formulated from acid resistance material to a specific gravity of approximately 1.100, commonly accepted as the specific gravity of water. The remaining floatation devices 440, 450, 460, 470, may be formulated with ever-increasing specific gravities, with the largest value at the bottom and each ascending floatation device having a lower specific gravity value than the predecessor. The floatation devices are designed with a size, shape, color, and density to effectively block the maximum amount of light in a discrete manner from the LED only onto a corresponding LRD. When device 300 is in a vertical position and immersed within the battery electrolyte fluid, floatation retention device 475 prevents the floatation devices from falling out of device 300 into the electrolyte and is easily removed to allow replacement, cleaning or re-calibration of the floatation devices.

In an exemplary SGOD, probe assembly 300 is immersed within an electrolyte fluid of a battery cell. All of the LED devices 410 thru 419 may be continuously illuminated, or sequentially staged by processor command. There may be little electrical output from the LRD devices until light is blocked from them. As the floatation device(s) pass the LED/LRD combination, ever increasing light is blocked from the LRD, until the maximum blockage is achieved when the floatation device is exactly centered on the LED/LRD position. As the light blocking floatation device travels beyond the exact center of the LED/LRD combination, the degree of passing allowed to the LCD begins to increase until there is no reflected light received by the LRD.

Once the floatation devices are contacted by the electrolyte, the floatation devices that can be fully supported by the specific gravity of the fluid float to the top of the vertical stack up, passing by each combination of LED and LRD on printed circuit board 401. The specific gravity of a fluid based electrolyte may always be greater than 1.100, therefore, floatation device 430 may always float to the electrolyte's surface providing an electrolyte level cell metric. As device 430 is acted upon by a fluid with a specific gravity greater than the material construction of device 430, the device begins to float upwards past the combinations of LED and LRD devices blocking light emitted from the LED it passes, from the LRD of the corresponding pair, signaling the floatation devices position on the light bar and a corresponding specific gravity can be calculated using software algorithms within the processor. As an example of an exemplary system, processor 480 provides a constant light source voltage and current to LED 419 providing a constant illuminated source of light that can only be blocked from LRD 429 when the floatation devices pass in front of the LED/LRD combination. This reduced light causes the LRD to either independently create an analogue signal, or amplifies or diminishes (conditions or modifies) an analog signal sent from the processor 480, via conductive means 495 to LRD 429 through the LRD device. The modified signal is returned to processor 480 and the position of the floatation ball can then be determined.

As device 440 is acted upon by a fluid with a specific gravity greater than the material construction of device 440, the device begins to float upwards past the combinations of LED and LRD devices blocking the light emitted from the LED it passes, from the LRD of the corresponding pair, signaling the floatation devices position on the light bar and a corresponding specific gravity can be calculated using software algorithms within the processor.

As device 450 is acted upon by a fluid with a specific gravity greater than the material construction of device 450, the device begins to float upwards past the combinations of LED and LRD devices blocking the light emitted from the LED it passes, from the LRD of the corresponding pair, signaling the floatation devices position on the light bar and a corresponding specific gravity can be calculated using software algorithms within the processor.

As device 460 is acted upon by a fluid with a specific gravity greater than the material construction of device 460, the device begins to float upwards past the combinations of LED and LRD devices blocking the light emitted from the LED it passes, from the LRD of the corresponding pair, signaling the floatation devices position on the light bar and a corresponding specific gravity can be calculated using software algorithms within the processor.

The processor unit 480 may consist of hardware such as a programmable processor, memory input/output means and associated circuitry, and a software program to provide a means to convert the raw analogue floatation device position along the light bar, into digital specific gravity data that can be used by instrumentation or a computer based system. The raw analogue signal may be conditioned or amplified by an electronic circuit either within or prior to processor 480. The processor board may have an integral temperature sensing device that provides temperature data the processor may use to compensate floatable disk data to temperature compensated disk data.

FIGS. 13A, 13B, 13C, 13D, and 13E shows the relationship of a single floatable specific gravity disk 430 positioned along the vertical light bar 401 with respect to a single paired LED 410 and LRD 420 array. Charts 13A, 13B, 13C, 13D, and 13E illustrate the change in voltage, or other conditioned signal, caused by the reflection of light from LED 410 by reflective disk 430, onto LRD 420. An exemplary Specific Gravity Optical Digitization device may have more than one LED/LRD paired arrays, or non-paired LED/LRD combinations sufficient to accommodate the desirous vertical distance, using one or more specially formulated floatable disks or alternatively shaped floatable devices. The use of more than one LED/LRD array may require a vertical spacing between arrays to accommodate the unique sampling range to be measured, or the physical size of the disk or alternatively shaped device, the calibration of the optically digitized output, or other factors, when the arrays are positioned on light bar 410. Processor 480 may support computer software programs and special software algorithms to process, store, and or bi-directionally transmit raw, modified or conditioned specific gravity data from the SGOD device to an external instrument or computer based operational system.

Figure 13:
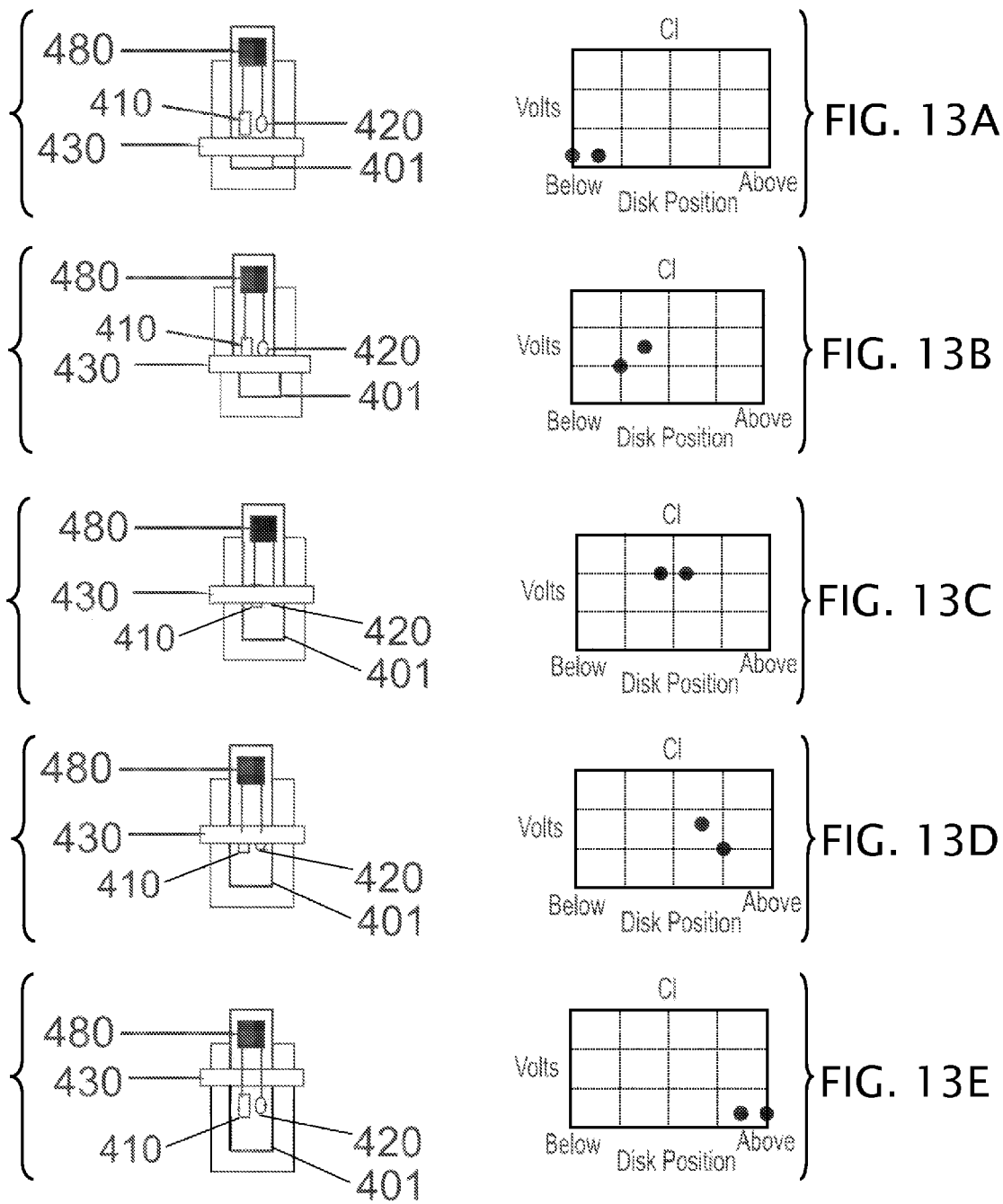

As shown in FIG. 13A, there is no reflection of light from LED 410 onto LRD 420 by disk 430, and therefore, little or no voltage or conditioned signal is sent from LRD 420 to processor 480, as shown in the Chart in FIG. 13A. As the reflective disk passes upwards in front of the LED/LRD combination as shown in FIG. 13B, an increasing amount of light is reflected from LED 410 onto LRD 420 and therefore, an increasing voltage or conditioned signal is sent from LRD 420 to processor 480, as shown in Chart in FIG. 13A.

As the reflective disk passes upwards in front of the LED/LRD combination to the midpoint of the LED/LRD combined array as shown in FIG. 13C, the maximum amount of light is reflected from LED 410 onto LRD 420 and therefore, the maximum voltage or conditioned signal is sent from LRD 420 to processor 480, as shown in Chart in FIG. 13C.

Once disk 430 has ascended to the maximum reflection position as shown in FIG. 13C, continued movement in the upwards direction as shown in FIG. 13D will begin to diminish the reflected light, reducing the voltage or conditioned signal sent from LRD 420 to processor 480, as shown in Chart in FIG. 13D. As shown in FIG. 13E, once disk 430 rises past a point that allows light to be reflected upon LRD 420, then the voltage or conditioned signal sent from LRD 420 to processor 480 may diminish to a minimum level, as shown in Chart in FIG. 13E. In the event that floating disk 430 becomes vertically stationary reflecting a partial or full amount of light from LED 410 onto LRD 420, then a continuous voltage or conditioned signal may be sent from LRD 420 to processor 480 indicating vertical disk positions on the light bar.

FIG. 14 is a block diagram of the HFISO power supply. The High Frequency—Isolated—Power Factor corrected power supply (HFISO) converts the supplied AC Mains voltage ranging from 100 to 300 VAC, to a current controlled power factor corrected output source delivered to the single or dual channel power pack system. The delivered controlled current level is determined by software and hardware means within the MCB 57, which compares the most previous capacitor discharge current level 52 and 62 of FIGS. 3 and 4, and the current measured peak amperage affect upon the battery 18 of FIGS. 3 and 4, after discharge into the battery. Magnetically isolated power supplies utilized in the IBO power supply section may use an external rectification 50 and 60, and capacitor switching means 51 and 61, as illustrated in FIGS. 3 and 4, however, an exemplary HFISO device may incorporate the capacitor input charge switching means 51 and 61, and rectification 84 within the HFISO device.

The HFISO power supply may contain circuitry to synchronize to the AC mains frequency to the output switches 53 of FIGS. 3 and 53 and 63 of FIG. 4. The HFISO power supply may provide output current proportional to the control input value when the AC mains are between $1/4\pi$ radians and $3/4\pi$ radians, and again between $5/4\pi$ radians and $7/4\pi$ radians. During inactive times the supply may present an open circuit equivalent (less than +/−1 mA) on its output lead. Full scale current shall be capable of restoring 0.45 C of charge to a capacitive load at up to 250 VDC during each $1/2\pi$ radian period of activity."

FIG. 14 shows that the AC Main supply 80 delivering current potential to the EMI Filter 81 and to both the Low Isolation ground transformer 82 and the High Isolation ground transformers in parallel. Low Side isolation transformer 82 acts as the isolated ground potential for the low voltage devices such as computers, displays, or other devices. High Side isolation transformer 83 acts as an isolated ground potential for the high voltage, power factor correction circuit.

FIG. 14 shows the current flow through EMI Filter 81, onwards to Rectifier 84 where the AC mains voltage is converted into DC voltage. In the single channel power pack HFISO power supply, the current the flows onward from Rectifier 84 to IGBT 85, then onwards to Inductor 87, then onwards to Capacitor 89, then onwards to IGBT 51. In the dual channel power pack HFISO power supply, the current the flows onward from Rectifier 84 to IGBT's 85 and 86, then onwards to Inductors 87 and 88, then onwards to Capacitors 89 and 90, then onwards to IGBT's 51 and 61.

Integrated circuit chip 92 is a Texas Instruments part number UCC 2870 or equivalent, 2 phase, interleaved power factor corrector that controls IGBT 85 and 86 to allow switching of the rectified current to charge the inductors 87 and 88, which then raises the voltage of capacitors 89 and 90 to approximately 400 volts. This stored intermediate high voltage is needed to efficiently store energy between the valleys of the mains voltage. The energy stored in a capacitor 89 and 90 is proportional to the voltage squared allowing for efficient energy storage (½ C*V squared), which is the basis for the Power Factor Correction process. Therefore, doubling the voltage of energy storage capacitors 89 and 90 will result in 4 times the effective energy storage.

Integrated circuit chip 91 is a Texas Instrument part number UCC 28950 or equivalent, is a full bridge, phase shifted, current mode regulated processor with synchronous rectification. This device switching arrangement converts the high voltage of 400-vdc stored in capacitor(s) 89 and 90, to our power pack channel pulsing capacitor 52 and 62, with exemplary design output voltages ranging from 6 to 100 volts. This conversion process is a standard flyback converter (for low power requirements) or half or full bridge converter topology (for 1 to 5 KW demands). The flyback converts the high voltage stored using capacitor 89 and 90, down to the operating voltage required to charge the final storage capacitor 52 and 62 of the power pack channels. This stage also accomplishes the galvanic isolation requirement by virtue of the flyback transformer design.

An optical isolator gives feedback to the mains-side controller 92 to regulate the voltage on the storage capacitor 89 and 90. The inductors 87 and 88 in conjunction with the switching devices within chip 92 cancel harmonics in the output current to the capacitors 89 and 90, and onwards to the respective power pack(s) channels. The resultant ripple or noise will be low and identical on all applied pulses because of the equal spacing of the firing pulses in time, and because of the synchronization of the firing pulses to the mains frequency.

The MCB 57 provides a command and control communication means in a bi-directional manner with integrated circuits 91 and 92 of the HFISO.

FIG. 15A illustrates that as the operator turns on the constant current discharge device, the current rises to the desired level at which point the current levels remain constant during the discharge test. As shown in the example, the operator has selected a 50 amp/hours discharge rate and when the test begins, the battery is being discharged at a constant rate of 50 amps.

FIG. 15B illustrates the IBO based system being used as a battery discharging device using a 25% ON State discharge rate. As the operator turns on the device, the current pulses are controlled and measured by the MCB, using discharge information provide by shunt 56 of FIGS. 16 and 17, to match the desired amps RMS target discharge rate. The MCB will increase the subsequent pulse duration ON State when the amps RMS falls below the desired target discharge rate, maintain the same subsequent ON State pulse duration when the amps RMS equals the desired target discharge rate, or decreases the subsequent ON State pulse duration when the amps RMS rises above the desired target discharge rate. Therefore, each repeating subsequent individual pulse is created by the MCB after comparing the measured affect upon the battery from the most previously applied pulse duration, to the target value of amps RMS. This cycle continues until the discharge test is terminated by the operator, or the battery meets or exceeds the requirements programmed into the MCB controlling software.

FIG. 15C illustrates the IBO based system being used as a battery discharging device using a 50% ON State discharge rate. As described in the previous paragraph and illustrated in FIG. 15B, the MCB controls the ON State duration of the IBO switching system to maintain a 100 amp discharge rate.

Battery systems are often tested for serviceability by using a Discharge Load Test to determine the runtime of the battery under an applied constant current average rate, measured in Amps RMS. During a Battery Discharge Test, the battery 18 of FIGS. 16 and 17, is connected using the Load Bank Interconnecting Means 70 of FIGS. 16 and 17, which is controlled by MCB 57 of FIGS. 16 and 17, to a resistive load means 73 of FIGS. 16 and 17, consisting of an individual resistor, or a grouping of serial or parallel connected resistors. The resistor values are selected to apply a discharge Amps RMS range when considering the battery nominal voltage(s) and the required energy dissipation of the resistors expressed in watts. Increasing the battery voltage during a hypothetical 50 amp discharge rate test will increase the required wattage rating of the resistors, while lowering the battery voltage during a 50 amp discharge rate test will lower the required wattage rating. This phenomenon complicates the design of conventional constant current battery discharge testing devices, requiring the changing of complicated switching and resistor combinations for each battery's nominal voltage.

During normal operation, the ON State of the device will provide a momentary maximum discharge amperage peak across the battery, the maximum of which is calculated using Ohm's Law. The duration of this peak is controlled by MCB 56 of FIGS. 16 and 17, and is measured in milli-seconds. The modulating frequency results in a average amps RMS value as seen by the battery.

When the switching means is turned off, a voltage peak is created from the inductive characteristics of the resistive load bank 73 of FIGS. 16 and 17. This inductive voltage peak left unregulated, can be several hundred volts to one thousand volts measured in micro-seconds.

As an example of a conventional, constant current resistive load bank system, a 48 volt battery to be discharged might use a 75 ohm resistive bank to provide a discharge rate of 64 amps, while dissipating 3072 watts. That same resistive value when applied to a 24 volt battery for example, would only provide a discharge rate of 32 amps, while dissipating 768 watts. Therefore, if the desired 24 volt discharge rate was 40 amps RMS, then the device shown in this example would be in-capable of attaining this discharge rate without altering the existing resistors, or adding resistors connected by an additional switching means, complicating the device design and manufacturing expense.

The IBO based system by contrast, uses one resistive value connected in parallel with additional resistors to increase the systems maximum wattage capability, and switches the connective means between the battery and the device at a frequency that results in the desirous target amps RMS discharge rate, regardless of the applied voltages, when the battery's rated values are equal to or less than the designed maximum discharge configuration. This allows for a more universal application of the device to differing battery types and sizes, while significantly simplifying the design and lowering the production costs.

When the discharging amp/hour rate has been selected by the operator, the system creates a pulse width modulated signal that allows the battery to discharge through a resistor or group of resistors, 51 of FIGS. 16 and 51 and 61 of FIG. 17. The value in ohms and the wattage dissipation rate of the resistors are selected in the design of the device to allow the maximum desired discharge rate, for the spectrum of applied battery types and capacities intended.

The system is intended to be universally applied to a wide range of battery types, voltages and amp/hour capacities. Considering the maximum battery voltage and amp/hour discharge rate when selecting the resistor values, then the largest battery type to be discharged would require an ON State of the IGBT/PWM based system of slightly less than 100%. In the event that a battery of the same nominal voltage with half of the intended applied amp/hours discharge rate were applied to the IBO discharge system, then the system would be expected to modulate at about slightly less than the 50% ON State.

Referring to the previous example, an exemplary IBO System used to discharge a 48 volt battery may have three 1.0 ohm, 1500 watt resistors connected in parallel, and when operated at a pulse width modulated rate of 44% providing a 64 amp RMS discharge rate, while dissipating 3,072 watts between three resistors, or 1,024 watts individually. This same IBO embodiment could be used to discharge a 24 volt battery at 64 amps RMS by simply operating the switching means at 89%, resulting in an individual resistor wattage dissipation rate of 512 watts. This same IBO embodiment could be used to discharge a 36 volt battery at 64 amps RMS by simply operating the switching means at 59%, resulting in an individual resistor wattage dissipation rate of 768 watts.

A voltage peak illustrated in FIG. 15B, is created by the instantaneous inductive rise within the resistive load bank 73 of FIG. 16 or FIG. 17, resulting from the rapid turn off of the IGBT based IBO switching means 51 of FIG. 16 when used as a single channel device, or switching means 51 and 61 of FIG. 17 of the dual channel system. Previously large voltage peaks may have been considered potentially harmful to the battery and to the controlling electronics of the IBO system, however the IBO system has been designed with hardware devices 71 of FIG. 16 and devices 71 and 72 of FIG. 17, and software controls provided by MCB 57, allowing the IBO to harness the beneficial range of this voltage peak using it as a means to further de-sulfate the battery.

This voltage peak can be controlled by the use of an electronics snubber device 71 of FIGS. 16, and 71 and 72 of FIG. 17, which controls the maximum peak amplitude of the voltage during the shutoff of the IGBT switching means. The voltage peak typically has a duration of a only a few micro-seconds, and snubbers 71 and 72 limit the voltage surge when the IBO switches are closed.

The use of an IBO system with more than one channel controlled by the MCB 57 of FIGS. 16 and 17 respectively, may create differing discharge algorithms applied to battery 18 of FIGS. 16 and 17 respectively. While the resultant amps RMS discharge would remain the same, the application of more than one channel switching means would allow for the creation of symmetrical, synchronous or asynchronous ON state frequencies. The application of more than one channel switching means would also allow for the creation of asymmetrical, synchronous or asynchronous ON state frequencies. The creation of these frequencies may be tuned to create a harmonic affect upon the battery, acting as a means to de-sulfate the battery An Example of the Process Used of the Preferred Embodiment of an Industrial Battery Optimization (IBO) System. (Exemplary Embodiment, not to be Considered Limiting)

The technician will position the IBO device near the existing battery charger and connect the battery charger output wiring to the "Battery Charger In" connections of the IBO. The technician will also connect the appropriate electrical line voltage source to the IBO.

Using a computer to interface to the IBO, the technician will then determine and save into the IBO operational memory one or more of the following: 1) the desired applied Peak-to Peak Amps to the battery, 2) the maximum allowable applied voltage to the battery, 3) the default time for the standard optimization runtime, 4) the default time for the extended optimization runtime, 5) the desired charge return factor to interrupt the charger to battery connection, 6) the timing duration of the capacitor charging subroutine if "time from zero" is used as opposed to "current flow from zero" to control the application of charge to the capacitors, 7) the maximum device internal temperature, 8) the maximum battery electrolyte temperature, 9) the maximum battery charging amperage, 10) the maximum and or minimum impedance levels of the battery or battery cells, 11) determine and input the before charge, during charge or after charge option for the application of the IBO Daily Equalization System Process, 12) set the desired charge completion based upon the battery cell specific gravity or battery cell impedance, determined using an external battery mounted probe, 13) any additional operational, safety or warning parameters of the battery or the IBO.

Once the technician has completed and saved the battery and IBO operational parameters into the IBO's internal memory, then the system is ready for automated application of battery optimization/DES.

During each subsequent charging cycle, the technician will plug the battery into the IBO Battery Connection and the IBO will then automatically allow the charger to charge the battery and apply the Daily Equalization System (DES) Process as pre-determined in the computer stored default settings. These pre-determined values may be automatically changed in real time, with the assistance of the technician, to reflect the changing condition of the battery.

Once the battery charge and IBO/DES process is completed, the technician will remove the battery from the IBO Battery Connection and place the battery back into service if the IBO indicates a "Cycle Complete" indication, or remove the battery for investigation if there is a "Fault" indication by the IBO of the battery's condition.

The technician will repeat this cycle for each battery that requires a re-charge.

Physical size of the illustrated version: Approximately 10 inches tall by 6 inches wide by 10 inches long.

Connector In/Out: USB or serial computer cables, AC power and ground, battery Charger IN connection, and Battery Out connection.

The attached figures illustrate various example embodiments and components thereof, including some optional components. The figures are merely exemplary, and should not be considered limiting in any way. One of skill in the art will understand that the schematically depicted illustrated embodiments may include appropriate circuitry, connectors, communications links, and the like.

While exemplary embodiments have been set forth above for the purpose of disclosure, modifications of the disclosed embodiments as well as other embodiments thereof may occur to those skilled in the art. Accordingly, it is to be understood that the disclosure is not limited to the above precise embodiments and that changes may be made without departing from the scope. Likewise, it is to be understood that it is not necessary to meet any or all of the stated advantages or objects disclosed herein to fall within the scope of the disclosure, since inherent and/or unforeseen advantages may exist even though they may not have been explicitly discussed herein.

Thus, specific embodiments of a universal industrial battery optimization device have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A battery optimization control device comprising:
   a current source;
   output conductors that is connectable to a battery;
   at least one positive channel power pack module and at least one negative channel power pack module electrically interposing the current source and the output conductors, each channel power pack module including a rectifier electrically connected to the current source, a capacitor electrically connected to an output of the rectifier, at least one switching device electrically connected to the capacitor, and a diode electrically connected to the output of the switching module;
   a controller that controls a conduction state of the at least one switching device;
   wherein the control is configured to control the conduction states of the at least one positive channel power pack module and at least one negative channel power pack module to provide a current output to the battery;
   wherein the at least one positive channel power pack module outputs a repeating pattern including an about 0.75 ms output followed by an about 9.75 ms OFF period and, together, at least one negative channel power pack module provide to the battery a repeating pattern including an about 0.75 ms output followed by an about 4.5 ms OFF period.

2. The battery optimization control device according to claim 1 wherein said output is a square pulse or a sine wave pulse or a saw tooth pulse or a triangular wave pulse.

3. The battery optimization control device according to claim 1 further comprising;
   a peak amperage indicator providing an indication of a peak amperage provided to the battery;
   a Kilo-watt hour indicator providing an indication of the consumed electrical energy restored to the battery from an external charging means, which is passed internally through the battery optimization control device from the external device to the battery;
   a Kilo-watt hour indicator providing an indication of the consumed electrical energy restored to the battery from an internal charging means;
   a Kilo-watt hour indicator providing an indication of the consumed electrical energy restored to the battery from an internal battery optimization means;
   a Kilo-watt hour indicator providing an indication of the consumed electrical energy flowing from the battery to a power consuming means or devices;
   an average amperage indicator providing an indication of a root-mean-square amperage provided to the battery;
   an electrolyte temperature indicator providing a real time indication of the battery electrolyte temperature during charging, the application of internal battery optimization means or discharge testing of the battery;
   a battery qualitative scoring indicator providing a real time indication of the calculated battery quality value derived from the comparison of currently measured battery metrics, to that same battery's historically measured and stored battery metrics, to a database of battery industry qualitative value metrics, or any combination thereof,
   and an impedance indicator providing an indication of the real time impedance of the battery during charging, during a battery optimization means, or during discharge of the battery;
   a specific gravity indicator providing a real time indication of the optically measured battery electrolyte acidity during charging, the application of internal battery optimization means or discharge testing of the battery, and
   wherein the impedance is determined at least in part by ascertaining a difference between the peak amperage provided to the battery and the root-mean-square amperage provided to the battery.

4. The battery optimization control device according to claim 1 wherein said battery optimization control device is located between the battery charger and the battery connective means, providing the automated interruption of said means to apply an internal battery de-sulfation process before, during or after the normal battery charging cycle, or any combination thereof.

5. The battery optimization control device according to claim 1 that provides at least one of a group consisting of, providing the automated interruption of said means to control the Charge Return Factor of a charger, providing the automated interruption of said means to apply an external device battery de-sulfation process before, during or after the normal battery charging cycle, or any combination thereof and providing the automated interruption of said means to reduce or eliminate a charger Equalization Charge being applied to the battery.

6. The Industrial Battery Optimization Control Device from claim 1 that is capable of scanning the battery or battery cell metrics of a group consisting of developing device commands based in whole or in part by scanned battery or battery cell metrics, and control internal, devices in the process of optimization of the battery in an automated manner, developing device commands based in whole or in part by scanned battery or battery cell metrics, and control external, devices in the process of optimization of the battery in an automated manner, developing device commands based in whole or in part by scanned battery or battery cell metrics, and control said devices in the process of optimization of the battery in an automated manner for the purpose of controlling a connected battery charger's charge return factor, developing and storing qualitative scoring data to determine the battery's life expectancy and performance characteristics and including optically digitized specific gravity, impedance, volts per cell and electrolyte temperature, battery electrical energy efficiency rations, then developing and storing qualitative scoring data to determine the battery's life expectancy and performance characteristics from such data.

7. The Industrial Battery Optimization Control Device from claim 1 that includes a Kelvin Connection device that accommodates at least one of a group consisting of the size and shape of an industrial battery cell-to-cell interconnection means, a device that easily penetrates the natural corrosive boundary layer of the interconnection means, a device that is constructed of sharpened contact pointed electrodes manufactured from corrosion resistant material, a device comprised of sharpened contact pointed electrodes that may allow the exposed pointed area to be extended or retracted in a manner to affect the calibration of the measured raw data, a device that is constructed of sharpened contact pointed electrodes spring pressure forced into the subsurface layer of the cell-to-cell interconnection means that may allow the increase or decrease of pressure to affect the calibration of the measured raw data, a connection constructed of sharpened contact pointed electrodes using an outer spring to apply pressure to an inner electrode, were the inner electrode is electrically isolated from the outer spring, a connection device comprised of sharpened contact pointed electrodes that may allow the measured length between the contact tip of the electrode and the attached connective flexible means to be increased or decreased to affect the calibration of the measured raw data, a connection device that easily accommodates the size and shape of certain industrial battery cell terminal posts, a connection device that is immersed within the battery electrolyte using corrosion resistant contact points contacting the electrolyte, a connection device that easily accommodates the size and shape of certain automotive, marine, telecomm or other battery terminal posts, a connection device that easily accommodates the size and shape of certain automotive, marine, telecomm or other battery interconnection means, a connection device that easily penetrates the applied corrosive preventive boundary layer of the interconnection means, a connection device that is constructed of sharpened contact pointed electrodes that are spring pressure forced into the subsurface layer of the cell-to-cell interconnection means of a battery cell array.

8. The Industrial Battery Optimization Control Device from claim 1 that has a battery cell interconnection means or battery terminal temperature that is sensed from either or both isolated electrodes, by using a thermistor, a thermocouple, a resistive temperature sensor, or equivalent temperature sensitive device in contact with the interconnection means or battery terminal.

9. The Industrial Battery Optimization Control Device from claim 1 that further includes an electrolyte immersed device that measures at least one of a group consisting of a temperature of the electrolyte by contacting the electrolyte fluid within a battery or battery cell, a device that measures the specific gravity by optical digitization of the physical movement of specific gravity sensitive device, floating past a light bar that provides a light source, a light receiving means and a processing module, comparing that floating specific gravity sensing device light output to the light output of a stationary and identical, non-floating light sensitive device, providing a baseline calibration of the electrolyte turbidity, a device that contains a specific gravity optical digitization processor with an integral temperature sensing device that provides temperature data the processor may use to compensate floatable disk data to temperature compensated disk data, a device that that in conjunction with a terminal or interconnecting means Kelvin connection, measures battery cell impedance between the electrolyte and the negative battery or battery cell terminal, a device that in conjunction with a terminal or interconnecting means Kelvin connection, measures battery cell impedance between the electrolyte and the positive battery or battery cell terminal, a device that the measures battery cell impedance between the electrolytes of adjacent batteries or adjacent battery cells, of a series connected array, a device that measures the voltage of the electrolyte by contacting the electrolyte fluid within a battery or battery cell, a device that in conjunction with a terminal or interconnecting means Kelvin connection, measures battery cell voltage between the electrolyte and the negative battery or battery cell terminal, a device that in conjunction with a terminal or interconnecting means Kelvin connection, measures battery cell voltage between the electrolyte and the positive battery or battery cell terminal and a device that the measures battery cell voltage between the electrolytes of adjacent batteries or adjacent battery cells, of a series connected array.

10. The Industrial Battery Optimization Control Device from claim 1 that further includes a Control Device that uses an integral processor, memory, computer software algorithms and hardware combinations, to apply specific calibration adjustments, schedules and data tables modifying the raw data output of the device sensors, transducers and probes
   providing a calibration compensation for the specific combination or permutation of the different arrangement possibilities of the stationary and non-stationary transducer elements, and a transducer support means.

11. The Industrial Battery Optimization Control Device from claim 1 that operates with a group consisting of taking a single battery or battery cell metric reading, or multiple cell metric reading of multiple cells, the quantity of individual readings approaching infinity if desirous, a calibration modification subroutines for cell electrolyte temperature and turbidity, processor temperature, applied probe pressure, ambient temperature, cell metric data averaging or smoothing, or other data calibration requirements, and a collect cell data that includes;

1) individual cell (battery) voltage;
2) individual cell (battery) temperature;
3) individual cell (battery) electrolyte temperature;
4) individual cell electrolyte level;
5) individual or comparative cell (battery) impedance as measured from cell post to cell post;
6) individual or comparative cell (battery) impedance as measured from cell electrolyte to the positive battery post;
7) cumulative battery or cell array impedance;
8) individual or comparative cell specific gravity;
9) individual or comparative battery or cell charging rate;
10) individual or comparative battery or cell discharging rate;
11) the individual or comparative peak-to-peak values of applied pulse width modulated signals to the battery or battery cells, either individually or collectively;
12) the individual or comparative peak-to-peak frequency values of applied pulse width modulated signals to the battery or battery cells, either individually or collectively;
13) the comparison of peak amperage amplitude vs., average amperage applied to the battery or battery cells, either individually or collectively;
14) the collection of individual or comparative raw data related to the calculation of a Charge Return Factor;
15) the individual or comparative raw data relating to the collection of the battery or battery cell electrical efficiency index;
16) the individual or comparative cell (battery) lifetime cumulative re-charging energy consumed, and
17) ambient operational temperature, a flexible conductive means from the stationary means to the probes, sensors and transducers utilizing a special wire twist, braided pattern, or shielding process to minimize electrical noise, RMI or RFI interference, a non-flexible conductive means from the probes, sensors and transducers of the device, to the processing unit, to reduce electrical noise, RMI or RFI interference, automatically determine the battery or cell array voltage, capacity or type by the physical configuration, the measured voltage and an RFID identifying chip located on the battery, a device that measures and collects raw individual cell data with a reference to a common ground, within a multi-cell battery array, a device capable of exporting raw or calibrated data in numerous electronic formats, allowing many different types and brands of external instruments or computer based operating systems to access the data, a device incorporating special software algorithms that create a "Virtual Cell Identification Number" for the purpose of applying unique calibration modifications to the raw data of every monitored cell or battery, a device that can calculate the cumulative cell metrics of the entire battery or cell array, a device provides for the electrical isolation of discrete battery or battery cell channels during the data collection process, measuring batteries or battery cells in a random, sequential, or a combined random and sequential monitoring algorithm, during the raw data collection process, a device provides the means to control external ancillary devices such as a charger or load-testing device.

12. The Industrial Battery Optimization Control Device from claim 1 that creates at least one of a group consisting of applying a pulse width modulated signal that can be operated in synchronization with the AC Mains Source at 2 pulses per cycle per channel, a 50 Hz AC Mains Source will provide approximately 200 cycles per second of a pulse width modulated de-sulfation signal, while a 60 Hz AC Mains Source will provide approximately 240 cycles per second of a pulse width modulated de-sulfation signal.

13. The Industrial Battery Optimization Control Device from claim 1 that further creates an applied pulse width modulated signal that operates using an integral High Frequency, Isolated, Power Factor Corrected power supply, which stores and releases current to the at least one positive channel power pack module and the at least one negative channel power pack module, the current storage and control capability allows the frequency of PWM signal to be varied, creating symmetrical or asymmetrical with respect to ON and OFF state duration, and synchronous or asynchronous with respect to ON state frequency when using a dual channel PWM de-sulfation system.

14. The Industrial Battery Optimization Control Device from claim 1 that creates an applied pulse width modulated signal that can be operated using an integral High Frequency, Isolated, Power Factor Corrected power supply, which can store and release current to the IBO device at least one positive channel power pack module and the at least one negative channel power pack module, the current storage and control capability allows the frequency and amplitude of the PWM signal to be varied, creating symmetrical or asymmetrical signals with respect to ON and OFF state frequency, synchronous or asynchronous channel signals when using a dual channel PWM de-sulfation system, the ON state signal can be varied between 0.1 and a continuously ON state, the OFF state can be varied between 0.1 and continuously OFF.

15. The Industrial Battery Optimization Control Device from claim 1 that creates an applied pulse width modulated signal that can be operated using an integral High Frequency, Isolated, Power Factor Corrected power supply, which can store and release current to the IBO device at least one positive channel power pack module and the at least one negative channel power pack module to allow numerous combinations of symmetrical and asymmetrical frequencies, synchronous or asynchronous pulse amplitudes, which in totality may provide for a harmonic affect upon the internal lead plates of the lead-acid battery, wherein the harmonic affect may provide for increased sulfation and an increase in battery performance.

16. The Industrial Battery Optimization Control Device from claim 1 that creates an applied pulse width modulated signal which can be operated by switching the flow of current from the positively orientated Charging and Industrial Battery Optimization pathways, to a negatively oriented Discharge pathway, through a variable or constant resistive load bank providing a means to discharge a battery for the purpose of testing the battery's discharge capacity and to de-sulafate the battery, the polarity of the current flow through the pulse width modulated device would be reversed from a charging current flow directional pathway, to a discharging current flow directional pathway;

the controlled device's variance of the pulse width modulated ON STATE frequency would correspondingly vary the current average discharged from the battery;

a lengthening of the applied pulse width modulated signal ON STATE frequency results in a higher discharge current flow measured in amps root mean squared;

a shortening of the applied pulse width modulated signal ON STATE frequency results in a lower discharge current flow measured in amps root mean squared;

an ON STATE frequency can be varied between 0 and a 100% duty cycle resulting in an average root mean square measured discharge rate between 0 amps RMS and the total capacity of the attached resistive load bank calculated using Ohms' Law;

a discharge rate between 0 and 1000 amps RMS;

the ON and OFF switching of a high current flow through a resistive load bank results in high inductive voltage peak applied to the battery plates, which are limited within the device's hardware and software design to harness the useful applied voltage peak range to de-sulfate the battery, that voltage peak range may vary between types of batteries, an exemplary embodiment would measure and control the applied inductive voltage peaks between 0 and 1000 volts per pulse;

wherein the control means is configured to control the conduction states of the at least one channel power pack module, or an alternating pattern between two or more channels to create an average discharge current output from the battery through a resistive load bank;

wherein the control means is configured to control the conduction states of the at least one channel power pack module, or an alternating pattern between two or more channels to create a discharge OFF State inductive voltage peaks within the battery;

wherein the measurement and control means is configured to control the amplitude of the inductive voltage peaks created during the discharge switching means OFF State, to provide a limited inductive voltage peak within the battery ranging from 0 to 1000 volts, to de-sulfate the battery;

wherein the at least one channel power pack module outputs a repeating pattern ranging from an about 0.0 ms output followed by an about 100% OFF period, to an about 100% ms output followed by an about 0.0 ms OFF period, together, or any combination in-between;

wherein the combination of one or more channel power pack modules outputs a repeating pattern, for the purpose of creating applied voltage and amperage discharge peaks within the battery, de-sulfating the battery as a means to improve the battery's performance, the variance of the pulse width modulated ON STATE current duration would correspondingly create variable peak voltage and amperage currents though the battery;

wherein the combination of one or more channel power pack modules outputs a repeating pattern, creating symmetrical or asymmetrical with respect to ON and OFF state duration, and synchronous or asynchronous with respect to ON state frequency when using a dual channel PWM discharging system;

wherein the combination of one or more channel power pack modules, and control means, outputs a repeating discharging pattern, discharging the battery at a rate which would then be measured in terms of minutes of discharge runtime, Amps RMS and KWH of discharge energy removed from the battery, and the volts per cell of an individual battery cell, or multiple individual cells sequentially or comparatively, or the volts per cell average of the combined individual cells constituting a battery; and the specific gravity of the battery cells electrolyte measured individually, sequentially or comparatively, or the average specific gravity of the combined individual cells constituting a battery, or any ratio analysis or qualitative factor resulting from the comparative combination of any of the aforementioned measurements;

wherein the combination of one or more channel power pack modules, and control means, outputs a repeating discharging pattern, automatically controlling or terminating this discharge pattern once the desirous level of runtime minutes has been attained or exceeded, the desirous level of Amps RMS has been attained or exceeded, the desirous level of KWH has been attained or exceeded, the desirous level of volts per cell of an individual cell, multiple cells sequentially or comparatively measured, or the average cell values of a battery, has been attained or exceeded; the desirous level of the electrolyte specific gravity of the battery cells electrolyte measured individually, sequentially or comparatively, or the average specific gravity of the combined individual cells constituting a battery, has been attained or exceeded, or any ratio analysis or qualitative factor resulting from the comparative combination of any of the aforementioned measurements has been attained or exceeded.

\* \* \* \* \*